(12) United States Patent
Kurita et al.

(10) Patent No.: US 10,275,854 B2
(45) Date of Patent: Apr. 30, 2019

(54) SIGNAL PROCESSING DEVICE, SIGNAL PROCESSING METHOD, SOLID-STATE IMAGE SENSOR, IMAGING DEVICE, AND ELECTRONIC DEVICE

(71) Applicant: SONY SEMICONDUCTOR SOLUTIONS CORPORATION, Kanagawa (JP)

(72) Inventors: Teppei Kurita, Tokyo (JP); Hideshi Yamada, Kanagawa (JP); Daisuke Iso, Tokyo (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 15/505,399

(22) PCT Filed: Aug. 21, 2015

(86) PCT No.: PCT/JP2015/073465
§ 371 (c)(1),
(2) Date: Feb. 21, 2017

(87) PCT Pub. No.: WO2016/035568
PCT Pub. Date: Mar. 10, 2016

(65) Prior Publication Data
US 2017/0256030 A1 Sep. 7, 2017

(30) Foreign Application Priority Data

Sep. 3, 2014 (JP) .................................. 2014-179554

(51) Int. Cl.
*G06T 3/40* (2006.01)
*G06T 5/00* (2006.01)
(Continued)

(52) U.S. Cl.
CPC ............... *G06T 3/40* (2013.01); *G06T 3/403* (2013.01); *G06T 5/002* (2013.01); *H04N 1/387* (2013.01);
(Continued)

(58) Field of Classification Search
CPC ........... G06T 3/40; G06T 5/002; G06T 3/403; H04N 1/387; H04N 5/232; H04N 5/217; H04N 5/23235; H04N 5/2628
(Continued)

(56) References Cited

U.S. PATENT DOCUMENTS

2003/0077001 A1  4/2003  Yamashita et al.
2008/0239145 A1  10/2008  Kimura
(Continued)

FOREIGN PATENT DOCUMENTS

CN   101536030 A   9/2009
CN   102831575 A   12/2012
(Continued)

OTHER PUBLICATIONS

International Search Report and Written Opinion of PCT Application No. PCT/JP2015/073465, dated Oct. 13, 2015, 08 pages of English Translation and 07 pages of ISRWO.

International Preliminary Report on Patentability of PCT Application No. PCT/JP2015/073465, dated Mar. 16, 2017, 08 pages of English Translation and 04 pages of IPRP.

*Primary Examiner* — Quang N Vo
(74) *Attorney, Agent, or Firm* — Chip Law Group

(57) ABSTRACT

The present technology relates to a signal processing device, a signal processing method, a solid-state image sensor, an imaging device, an electronic device, and a program capable of generating an interpolated pixel such that occurrence of jaggies may be inhibited without blurring an image with a small calculation amount. Two candidate lines are set in each of a horizontal direction and a vertical direction in positional relationship symmetrical about a current pixel.

(Continued)

The candidate lines are narrowed to two lines in the horizontal direction or in the vertical direction according to a pattern to which the current pixel belongs. Furthermore, searched pixels on the candidate line are narrowed according to the pattern. A weight value is calculated on the basis of similarity between a current block and a block in the same phase at the same distance from the block by block matching by a block to which the current pixel belongs. A pixel value of the interpolated pixel is generated by weighted addition of a pixel value on the candidate line and the weight value. The present technology may be applied to an imaging device.

16 Claims, 23 Drawing Sheets

(51) Int. Cl.
  H04N 5/232      (2006.01)
  H04N 1/387      (2006.01)
  H04N 5/217      (2011.01)
  H04N 5/262      (2006.01)
(52) U.S. Cl.
  CPC ............. *H04N 5/217* (2013.01); *H04N 5/232* (2013.01); *H04N 5/23235* (2013.01); *H04N 5/2628* (2013.01)
(58) Field of Classification Search
  USPC ................................. 358/3.27, 3.26, 1.9, 525
  See application file for complete search history.

(56) References Cited

U.S. PATENT DOCUMENTS

| | | | |
|---|---|---|---|
| 2009/0237549 A1* | 9/2009 | Amano | H04N 1/387 348/333.12 |
| 2010/0045862 A1 | 2/2010 | Burns et al. | |
| 2010/0074558 A1* | 3/2010 | Lim | G06T 3/40 382/300 |
| 2012/0269455 A1 | 10/2012 | Mitsunaga et al. | |
| 2013/0050272 A1 | 2/2013 | Bernard | |
| 2013/0051703 A1 | 2/2013 | Bernard | |
| 2015/0062384 A1* | 3/2015 | Tanaka | G06T 5/004 348/240.2 |

FOREIGN PATENT DOCUMENTS

| | | |
|---|---|---|
| DE | 112011101632 T5 | 5/2013 |
| EP | 2182484 A1 | 5/2010 |
| GB | 2443858 A | 5/2008 |
| GB | 2492039 A | 12/2012 |
| JP | 2003-092736 A | 3/2003 |
| JP | 2007-060104 A | 3/2007 |
| JP | 2008-252449 A | 10/2008 |
| JP | 2009-038578 A | 2/2009 |
| JP | 2009-059011 A | 3/2009 |
| JP | 2012-234507 A | 11/2012 |
| JP | 2012-253684 A | 12/2012 |
| WO | 2008/059218 A2 | 5/2008 |
| WO | 2009/028230 A1 | 3/2009 |
| WO | 2011/141196 A1 | 11/2011 |
| WO | 2011/141197 A1 | 11/2011 |

* cited by examiner

| w(0,0) | | | | |
|---|---|---|---|---|
| 1/256 | −4/256 | −10/256 | −4/256 | 1/256 |
| −4/256 | 16/256 | 40/256 | 16/256 | −4/256 |
| −10/256 | 40/256 | 100/256 | 40/256 | −10/256 |
| −4/256 | 16/256 | 40/256 | 16/256 | −4/256 |
| 1/256 | −4/256 | −10/256 | −4/256 | 1/256 | w(2, 2)      w(4, 3)

FIG. 19

| w(0,0) | | |
|---|---|---|
| −1/4 | 0 | −1/4 |
| 0 | 1 | 0 |
| −1/4 | 0 | −1/4 | w(1, 1)

SIGNAL PROCESSING DEVICE, SIGNAL PROCESSING METHOD, SOLID-STATE IMAGE SENSOR, IMAGING DEVICE, AND ELECTRONIC DEVICE

CROSS REFERENCE TO RELATED APPLICATIONS

This application is a U.S. National Phase of International Patent Application No PCT/JP2015/073465 filed on Aug. 21, 2015, which claims priority benefit of Japanese Patent Application No. JP 2014-179554 filed in the Japan Patent Office on Sep. 3, 2014. Each of the above-referenced applications is hereby incorporated herein by reference in its entirety.

TECHNICAL FIELD

The present technology relates to a signal processing device, a signal processing method, a solid-state image sensor, an imaging device, an electronic device, and a program, and especially relates to the signal processing device, the signal processing method, the solid-state image sensor, the imaging device, the electronic device, and the program capable of inhibiting occurrence of jaggies without blurring an image with a small calculation amount.

BACKGROUND ART

There is technology of putting a value in an empty pixel from peripheral pixels as a method of interpolating a pixel value. For example, bilinear interpolation and bicubic interpolation are typical examples; this may easily cause jaggies (uneven edge which is not smooth) in an interpolation result.

Although there also is a method of interpolating by using a low-pass filter with a low pass frequency band, this does not cause the jaggies but the image is easily blurred.

Therefore, technology of calculating similarity between positions symmetrical about a current position by block matching, determining whether they belong to the same pattern as that of the current pixel, and obtaining an interpolated value by an average value thereof, thereby enabling image enlargement in one direction is suggested as a method of using the block matching (refer to Patent Document 1).

Also, technology of reducing the jaggies by adding pixel values in the positions symmetrical about the current position in the same manner is suggested (refer to Patent Document 2). In this method corresponding to many angles, a jaggy opposite phase which reduces the jaggies in principle is searched and the pixel values in one line above and below the current pixel on an interpolated image are utilized.

CITATION LIST

Patent Document

Patent Document 1: Japanese Patent No. 4343255
Patent Document 2: Japanese Patent Application Laid-Open No. 2012-234507

SUMMARY OF THE INVENTION

Problems to be Solved by the Invention

However, in the technology in Patent Document 1, when correlation between a pattern located in the current position and the pattern to which a reference pixel belongs is low, the jaggies cannot be appropriately reduced, so that there is a case in which the jaggies at an acute angle cannot be reduced.

Also, in the technology in Patent Document 2, the jaggy opposite phase to reduce the jaggies in principle is searched to correspond to many angles; however, the values are brought from one line above and below the current pixel on the interpolated image, so that the image easily blurs.

The present technology is achieved in view of such a condition and an object thereof is to inhibit occurrence of the jaggies with a small calculation amount without blurring the image.

Solutions to Problems

A signal processing device according to an aspect of the present technology includes a current position selection unit which selects a pixel position on an input image as a current pixel being a pixel in a current position a pixel value of which is interpolated, a candidate line setting unit which sets at least two groups of lines, each group including assembly of at least one line in the same direction including at least two pixels having known pixel values in the vicinity of the current pixel as candidate lines, a candidate line narrowing unit which narrows the candidate lines on the basis of a pattern to which the current pixel belongs, and an interpolated value calculation unit which calculates the pixel value of the current pixel as an interpolated value by interpolation based on each pixel on the candidate line narrowed by the candidate line narrowing unit.

The candidate lines may include two groups of the candidate lines orthogonal to each other, each group including two candidate lines in positional relationship symmetrical about the current pixel.

The two groups of the candidate lines orthogonal to each other may be the candidate lines in a horizontal direction and the candidate lines in a vertical direction.

The candidate lines may include four groups of the candidate lines intersected at a 45-degree angle, each group including two candidate lines in positional relationship symmetrical about the current pixel.

The candidate lines may include the candidate line passing through the current pixel.

A weight value calculation unit which sequentially searches the pixels on the candidate line and calculates a weight value according to a degree of expectation that a searched pixel being a pixel to be searched on the candidate line belongs to the same pattern as the pattern to which the current pixel belongs may be further included, wherein the interpolated value calculation unit may interpolate by weighted addition using a pixel value of each pixel on the candidate line narrowed by the candidate line narrowing unit and the weight value and calculate the pixel value of the current pixel as the interpolated value.

A searched pixel narrowing unit which narrows searched pixels on the candidate line on the basis of the pattern to which the current pixel belongs may be further included.

The pattern to which the pixel belongs may be an edge in the image.

An artifact reduction unit which reduces an artifact by an image processing filter which reduces a high-frequency component from the interpolated value may be further included.

At least another type of interpolated value calculation unit which calculates the interpolated value by an interpolation method different from the interpolation method by the interpolated value calculation unit, and a pattern classification unit which classifies the pattern to which the current pixel belongs, determines whether to output the interpolated value calculated by the other interpolated value calculation unit on the basis of a classification result, and outputs the interpolated value calculated by the other interpolated value calculation unit according to a determination result may be further included, wherein the interpolated value calculation unit may calculate the interpolated value and output the calculated interpolated vale when the pattern classification unit determines not to output the interpolated value calculated by the other interpolated value calculation unit on the basis of the classification result.

A pattern classification unit which classifies the pattern to which the current pixel belongs, at least another type of interpolated value calculation unit different from the interpolation method by the interpolated value calculation unit, and an interpolated value selection unit which selects the interpolated value to be output from a plurality of interpolated values on the basis of a type of the pattern classified by the pattern classification unit may be further included.

A signal processing method according to an aspect of the present technology includes steps of selecting a pixel position on an input image as a current pixel being a pixel in a current position a pixel value of which is interpolated, setting at least two groups of lines, each group including assembly of at least one line in the same direction including at least two pixels having known pixel values in the vicinity of the current pixel as candidate lines, narrowing the candidate lines on the basis of a pattern to which the current pixel belongs, and calculating the pixel value of the current pixel as an interpolated value by interpolation based on each pixel on the narrowed candidate line.

A program according to an aspect of the present technology allows a computer to serve as a current position selection unit which selects a pixel position on an input image as a current pixel being a pixel in a current position a pixel value of which is interpolated, a candidate line setting unit which sets at least two groups of lines, each group including assembly of at least one line in the same direction including at least two pixels having known pixel values in the vicinity of the current pixel as candidate lines, a candidate line narrowing unit which narrows the candidate lines on the basis of a pattern to which the current pixel belongs, and an interpolated value calculation unit which calculates the pixel value of the current pixel as an interpolated value by interpolation based on each pixel on the candidate line narrowed by the candidate line narrowing unit.

A solid-state image sensor according to an aspect of the present technology includes a current position selection unit which selects a pixel position on an input image as a current pixel being a pixel in a current position a pixel value of which is interpolated, a candidate line setting unit which sets at least two groups of lines, each group including assembly of at least one line in the same direction including at least two pixels having known pixel values in the vicinity of the current pixel as candidate lines, a candidate line narrowing unit which narrows the candidate lines on the basis of a pattern to which the current pixel belongs, and an interpolated value calculation unit which calculates the pixel value of the current pixel as an interpolated value by interpolation based on each pixel on the candidate line narrowed by the candidate line narrowing unit.

An imaging device according to an aspect of the present technology includes a current position selection unit which selects a pixel position on an input image as a current pixel being a pixel in a current position a pixel value of which is interpolated, a candidate line setting unit which sets at least two groups of lines, each group formed of assembly of at least one line in the same direction including at least two pixels having known pixel values in the vicinity of the current pixel as candidate lines, a candidate line narrowing unit which narrows the candidate lines on the basis of a pattern to which the current pixel belongs, and an interpolated value calculation unit which calculates the pixel value of the current pixel as an interpolated value by interpolation based on each pixel on the candidate line narrowed by the candidate line narrowing unit.

An electronic device according to an aspect of the present technology includes a current position selection unit which selects a pixel position on an input image as a current pixel being a pixel in a current position a pixel value of which is interpolated, a candidate line setting unit which sets at least two groups of lines, each group including assembly of at least one line in the same direction including at least two pixels having known pixel values in the vicinity of the current pixel as candidate lines, a candidate line narrowing unit which narrows the candidate lines on the basis of a pattern to which the current pixel belongs, and an interpolated value calculation unit which calculates the pixel value of the current pixel as an interpolated value by interpolation based on each pixel on the candidate line narrowed by the candidate line narrowing unit.

According to an aspect of the present technology, a pixel position on an input image is selected as a current pixel being a pixel in a current position a pixel value of which is interpolated, at least two groups of lines, each group including assembly of at least one line in the same direction including at least two pixels having known pixel values in the vicinity of the current pixel are set as candidate lines, the candidate lines are narrowed on the basis of a pattern to which the current pixel belongs, and the pixel value of the current pixel is calculated as an interpolated value by interpolation based on each pixel on the narrowed candidate line.

A signal processing device, a solid-state image sensor, an imaging device, and an electronic device according to an aspect of the present technology may be independent devices or blocks which serve as the signal processing device, the solid-state image sensor, the imaging device, and the electronic device.

Effects of the Invention

According to an aspect of the present technology, it becomes possible to inhibit occurrence of jaggies without blurring an image with a small calculation amount.

BRIEF DESCRIPTION OF DRAWINGS

FIG. 3 is a view illustrating an example of an image obtained by doubling in the horizontal direction and in the vertical direction in which an interpolated pixel is generated by bilinear interpolation.

FIG. 5 is a view illustrating periodicity in the image in which the interpolated pixel is generated by the bilinear interpolation.

FIG. 14 is a view illustrating an operation method of the interpolated pixel based on the weight value.

FIG. 15 is a view illustrating an example of a FIR filter in an artifact reduction process.

FIG. 19 is a view illustrating a configuration example of a filter used in a pattern classification unit in the signal processor in FIG. 18.

MODE FOR CARRYING OUT THE INVENTION

<Configuration Example of One Embodiment of Signal Processor to which Present Technology is Applied>

Figure 1:
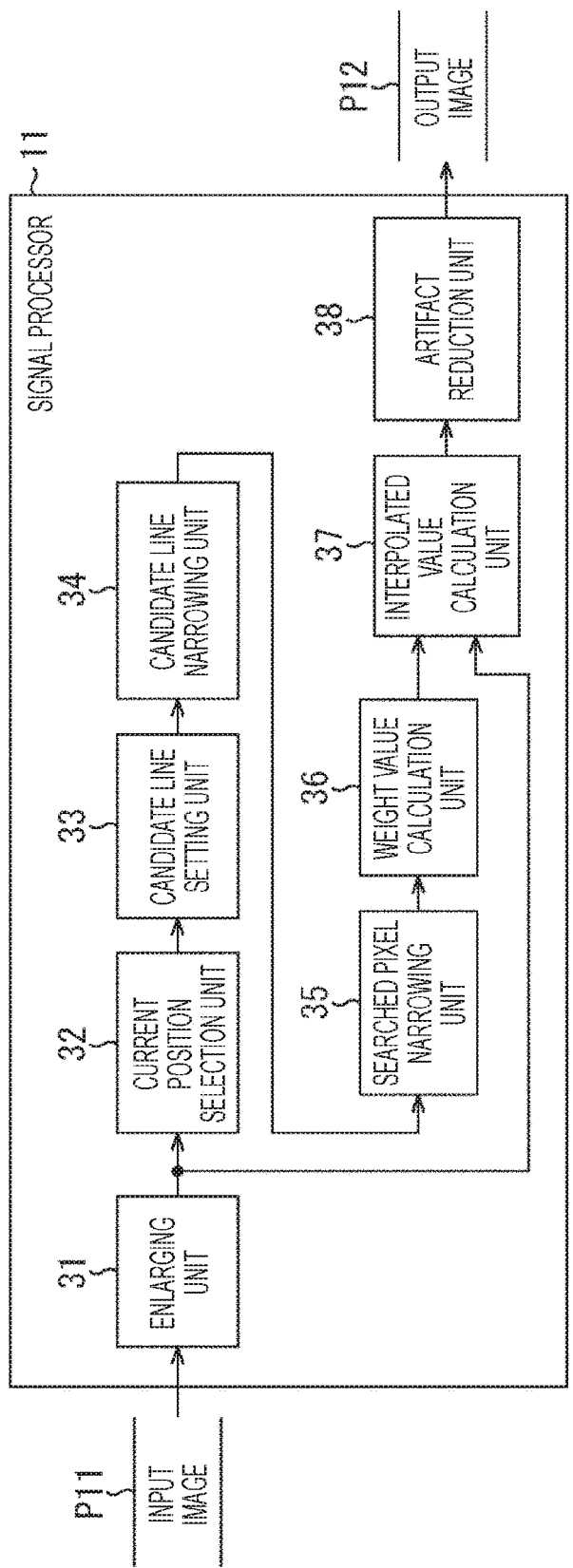
FIG. 1 is a view illustrating a configuration example of one embodiment of a signal processing device to which the present technology is applied.

FIG. 1 illustrates a configuration example of one embodiment of a signal processor to which the present technology is applied.

A signal processor 11 in FIG. 1 realizes up-sampling and demosaicing by interpolating/generating an unknown pixel on the basis of a known pixel for an input image. The signal processor 11 built-in a solid-state image sensor and an electronic device as typified by an imaging device, a smartphone and the like, for example, interpolates/generates the unknown pixel included in an imaged image or an input image by using the known pixel.

Meanwhile, although an example in which the signal processor 11 enlarges the input image to perform the up-sampling is hereinafter described, this may also be used in a so-called demosaicing process in which the unknown pixel is included in the input image itself and this is interpolated/generated on the basis of the known pixel.

More specifically, the signal processor 11 is provided with an enlarging unit 31, a current position selection unit 32, a candidate line setting unit 33, a candidate line narrowing unit 34, a searched pixel narrowing unit 35, a weight value calculation unit 36, an interpolated value calculation unit 37, and an artifact reduction unit 38.

Figure 2:
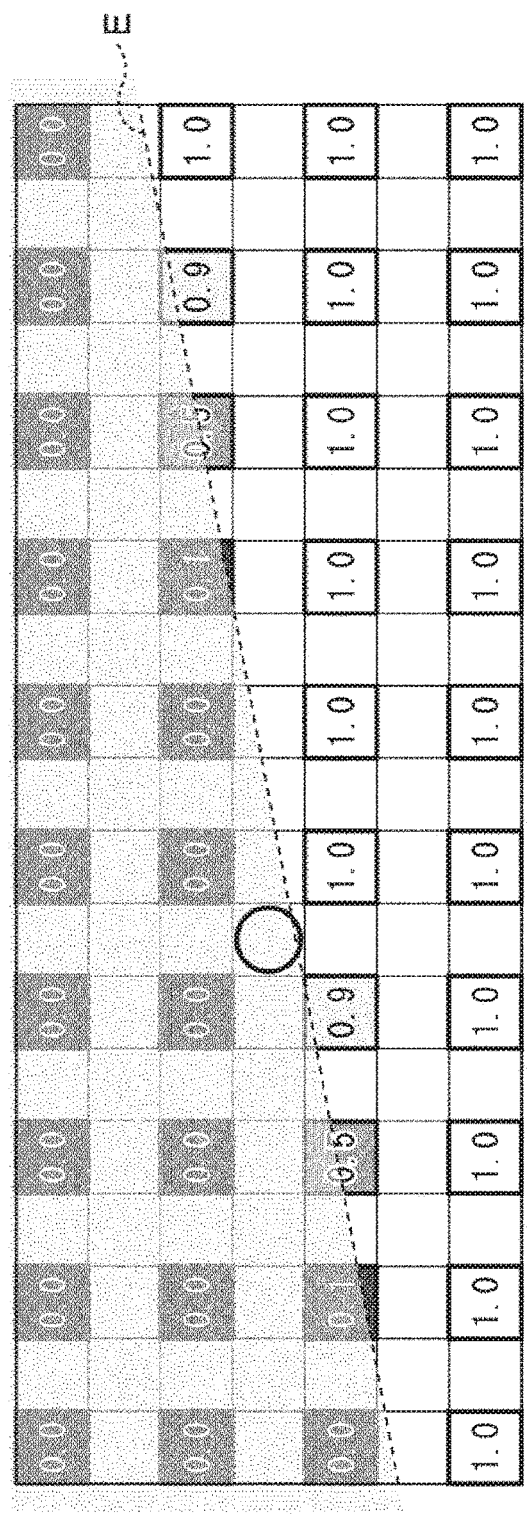
FIG. 2 is a view illustrating an example of an image obtained by doubling an input image in a horizontal direction and in a vertical direction.

The enlarging unit 31 rearranges the known pixels included in an input image P11 according to predetermined magnification and generates an enlarged image including the unknown pixel to output to the current position selection unit 32. For example, when doubling in a horizontal direction and in a vertical direction, the enlarging unit 31 makes the pixels of the input image P11 the known pixels and rearranges them such that the unknown pixel is interposed between respective pixels in the horizontal direction and in the vertical direction as illustrated in FIG. 2, for example. According to this, the enlarged image doubled in the horizontal direction and in the vertical direction in which the known pixel and the unknown pixel are alternately arranged one by one in the horizontal direction and in the vertical direction is generated. Meanwhile, in FIG. 2, a square-shaped cell represents the pixel; the cell in which a value indicating a pixel value normalized to values from 0 to 1 is input represents the known pixel, and the cell without the value represents the unknown pixel.

The current position selection unit 32 selects any one of the unknown pixels not yet processed out of the pixels included in the enlarged image as the pixel in a current position and supplies information of the pixel in the current position being a selection result to the candidate line setting unit 33 as the current pixel.

Since it is required to assume a direction of a pattern to which the current pixel belongs when setting the pixel value of the current pixel, the candidate line setting unit 33 sets a candidate line required when determining the direction of the pattern to which this belongs. More specifically, when an example of the pattern to which the current pixel belongs is an edge to which the current pixel belongs, for example, the candidate line setting unit 33 sets a candidate line group close to the horizontal direction and the candidate line group close to the vertical direction for determining a direction of the edge and outputs the same to the candidate line narrowing unit 34.

Figure 3:
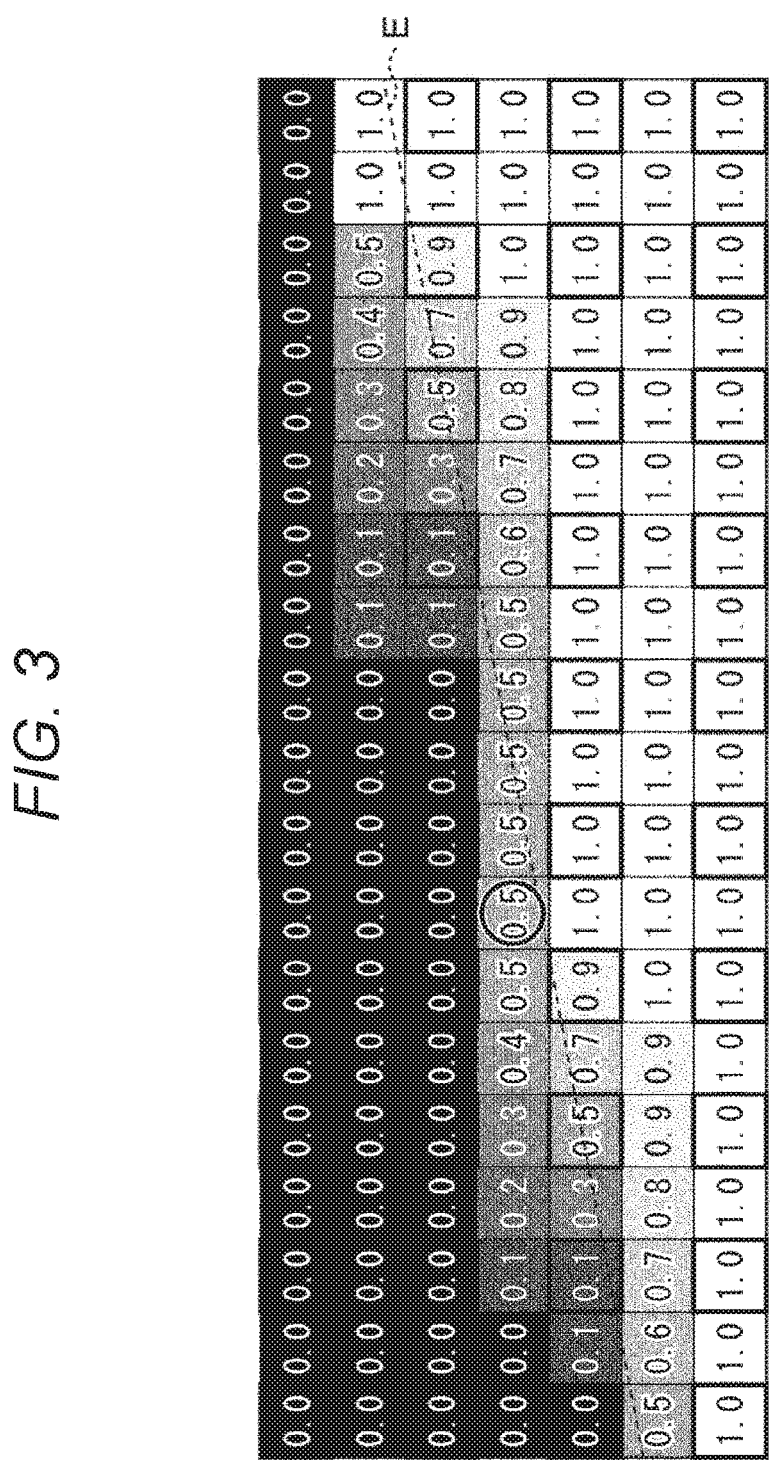

For example, in the image formed of the known pixels and the unknown pixels illustrated in FIG. 2, when each unknown pixel is subjected to bilinear interpolation, an image illustrated in FIG. 3 is generated. Meanwhile, in the images illustrated in FIGS. 2 and 3, the cell in a position indicated by a circle is the current pixel to be processed and an edge E is present in a position indicated by a dotted line including the current pixel. Also, as for each pixel value, when the image is formed of RGB pixels, a pixel value of a Y pixel when they are converted to YUV pixels, that is to say, a so-called luminance value Y is represented as the pixel value.

In a case in FIG. 3, pixel values of five pixels in the horizontal direction with the current pixel located in a leftmost position are 0.5; they are represented to have the same pixel value. According to this, the pixel values of the pixels on the edge E in the image illustrated in FIG. 3 change unnaturally, and as a result, jaggies occur in the image.

Figure 4:
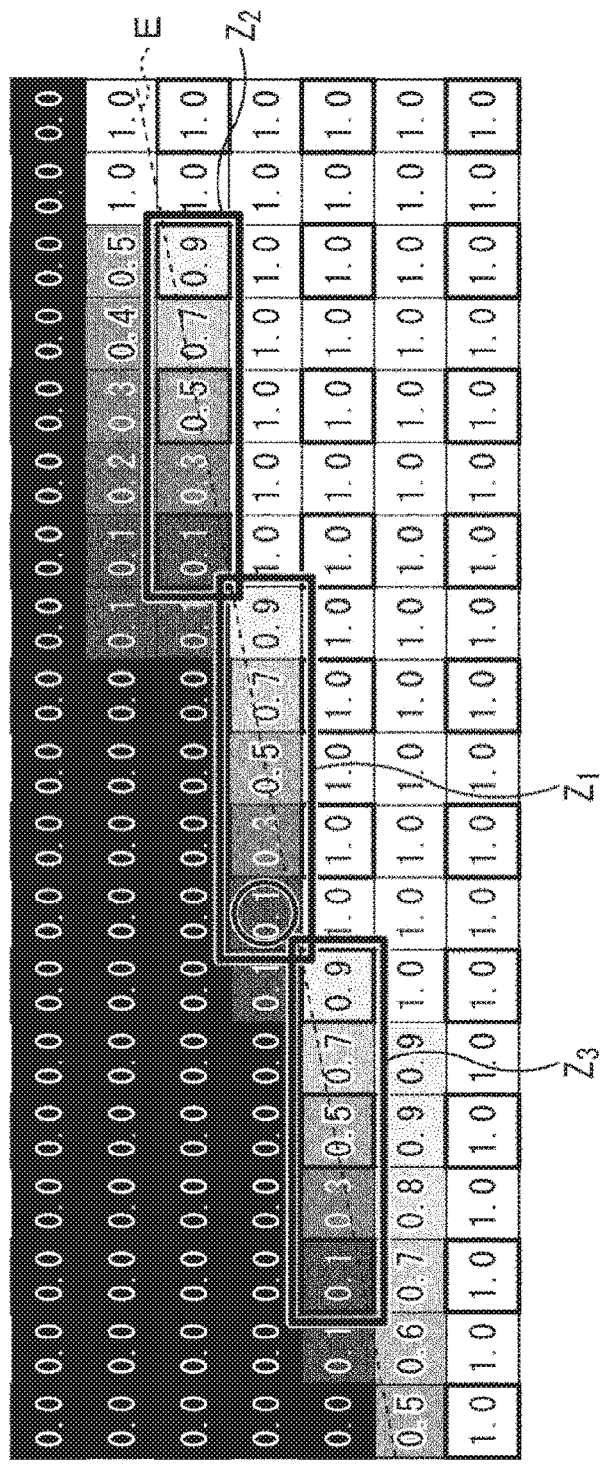
FIG. 4 is a view illustrating an example of an image obtained by doubling in the horizontal direction and in the vertical direction in which the interpolated pixel is generated by an ideal method.

On the other hand, FIG. 4 illustrates an image generated when the unknown pixel in FIG. 2 is ideally interpolated by the known pixel. In the image in FIG. 4, there is gradation in the pixel values of the pixels arranged on the edge E. In such a case, a gradation area in which the pixel values smoothly change is periodically present in the pixel values of the interpolated/generated pixels.

In the present technology, the pixel value of the unknown pixel is interpolated by using the pixel value of the known pixel and the periodicity of the pixel values of the pixels arranged on the edge E.

That is to say, in a case of the image in FIG. 4, it is illustrated that, when respective pixels in an area Z1 set in unit of five pixels in the horizontal direction with the current pixel as the leftmost pixel are read from the left, the gradation in which the pixel values smoothly change such as 0.1, 0.3, 0.5, 0.7, and 0.9 is formed. Furthermore, it is illustrated that areas Z2 and Z3 corresponding to the area Z1 in unit of five pixels are periodically and repeatedly arranged along the edge E. When the area in which the pixel values change with the same period is repeatedly and periodically arranged in this manner, this means that the same pattern is periodically drawn.

Figure 5:
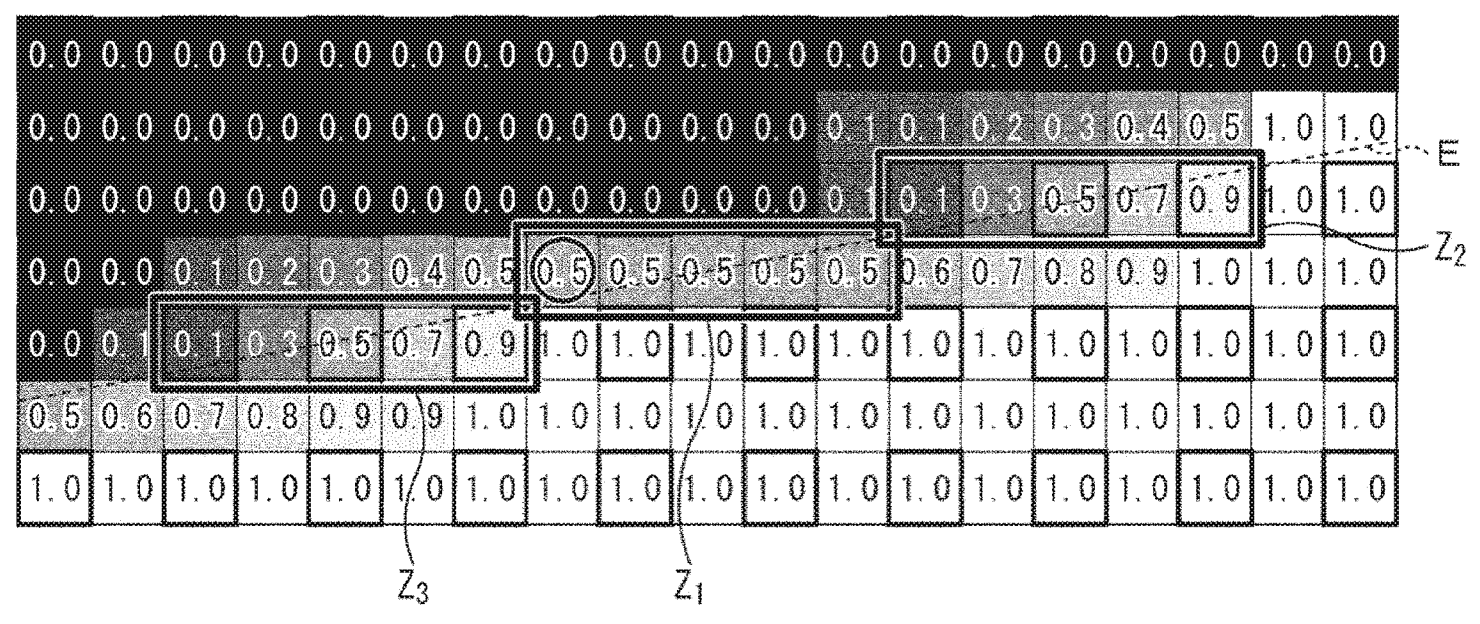

On the other hand, in a case of the image generated in a bilinear method, as illustrated in FIG. 5, for example, it is illustrated that the area in which the pixel values are uniform and the area in which they gradually and smoothly change are alternately arranged as for the areas Z2, Z1, and Z3 of five pixels corresponding to FIG. 4 with the current pixel as the leftmost pixel.

Figure 6:
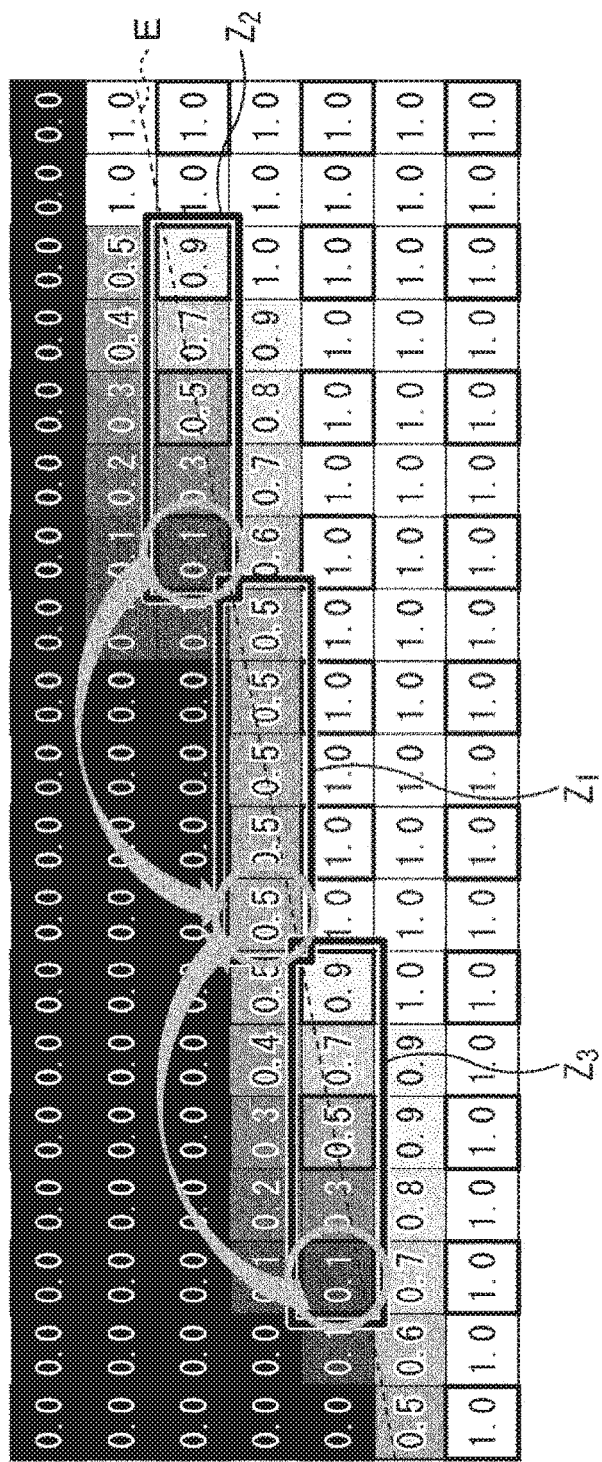
FIG. 6 is a view schematically illustrating a method of generating the interpolated pixel to which the present technology is applied.

Therefore, in the present technology, as illustrated in FIG. 6, the areas Z2 and Z3 in the same phase which are in a phase opposite to that of the area Z1 including the current pixel are searched in one line above and below the line including the current pixel and the pixel value of the current pixel is obtained by interpolation by weighted addition of the pixel value of the pixel in the position corresponding to the current pixel of each of the searched areas Z2 and Z3.

The candidate line setting unit 33 sets two lines in the horizontal direction and in the vertical direction including the known pixel, the two lines symmetrical about the current pixel as the candidate lines. For example, the two candidate lines in the horizontal direction and in the vertical direction are lines H1 and H2 in the horizontal direction and lines V1 and V2 in the vertical direction illustrated in FIG. 7. That is to say, in a case of FIG. 6, the candidate lines are the lines H1 and H2 above and below the line in which the area Z1 is present in which the areas Z2 and Z3 in the phase opposite to the phase of the area Z1 should be searched, and the candidate line setting unit 33 sets them not only in the horizontal direction but also in the vertical direction as the lines V1 and V2.

The candidate line narrowing unit 34 narrows the set candidate lines to the candidate lines required for processing to select. In a case in FIGS. 2 to 5, for example, the line to which the edge E being the pattern to which the current pixel belongs is close to the horizontal direction, so that it is narrowed to the lines H1 and H2.

Figure 8:
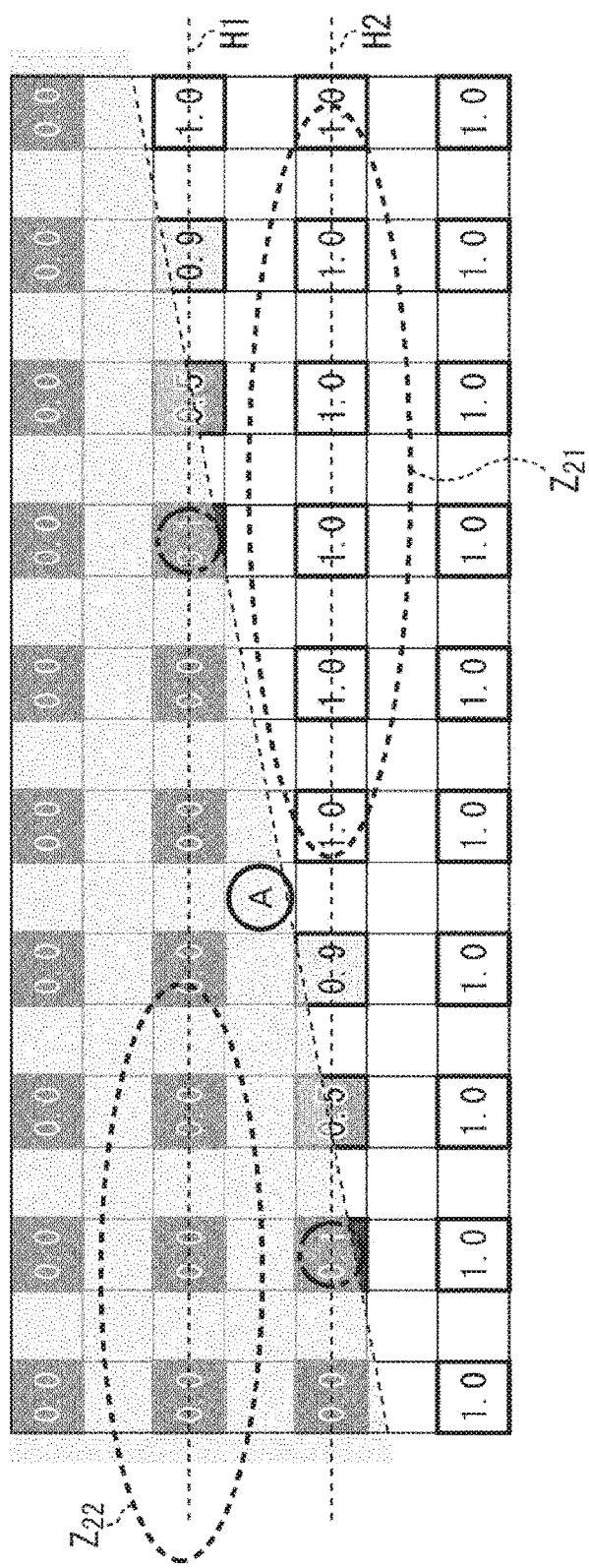
FIG. 8 is a view illustrating narrowing of a searched pixel.

When the retrieved pixel narrowing unit 35 searches whether there is the above-described periodicity in pixel unit, the pixel in an area surrounded by the pixels of any known pixel value is determined to have the pixel value of the surrounding pixels, so that this is not required to be searched. Therefore, this narrows to only the pixel which should be searched. For example, as illustrated in FIG. 8, it is not required to search the known pixels in the areas Z21 and Z22, the pixel in the area Z21 has the pixel value of 1.0, and the pixel in the area Z22 has the pixel value of 0.0, so that they may be removed from a search target. Therefore, in a case of FIG. 10, the retrieved pixel narrowing unit 35 narrows the pixels to be searched to the known pixels on the candidate lines H1 and H2, the pixels in the area other than the areas Z21 and Z22.

The weight value calculation unit 36 calculates a value of expectation that the pixel on the candidate line, the pixel to be searched is the pixel to be processed, that is to say, the current pixel as a weight value. Meanwhile, a method of calculating the weight value is to be described later in detail.

The interpolated value calculation unit 37 interpolates/generates the pixel value of the current pixel by the weighted addition using the weight value calculated by the weight value calculation unit 36 and each pixel value.

The artifact reduction unit 38 reduces an artifact occurring in the image formed of the interpolated pixel by applying a filter process to the interpolated/generated pixel value and outputs the same as an output image P12.

By such a process, the signal processor 11 interpolates/generates the pixel value of the unknown pixel from the known pixel to realize the up-sampling and demosaicing.

<First Signal Processing>

Figure 9:
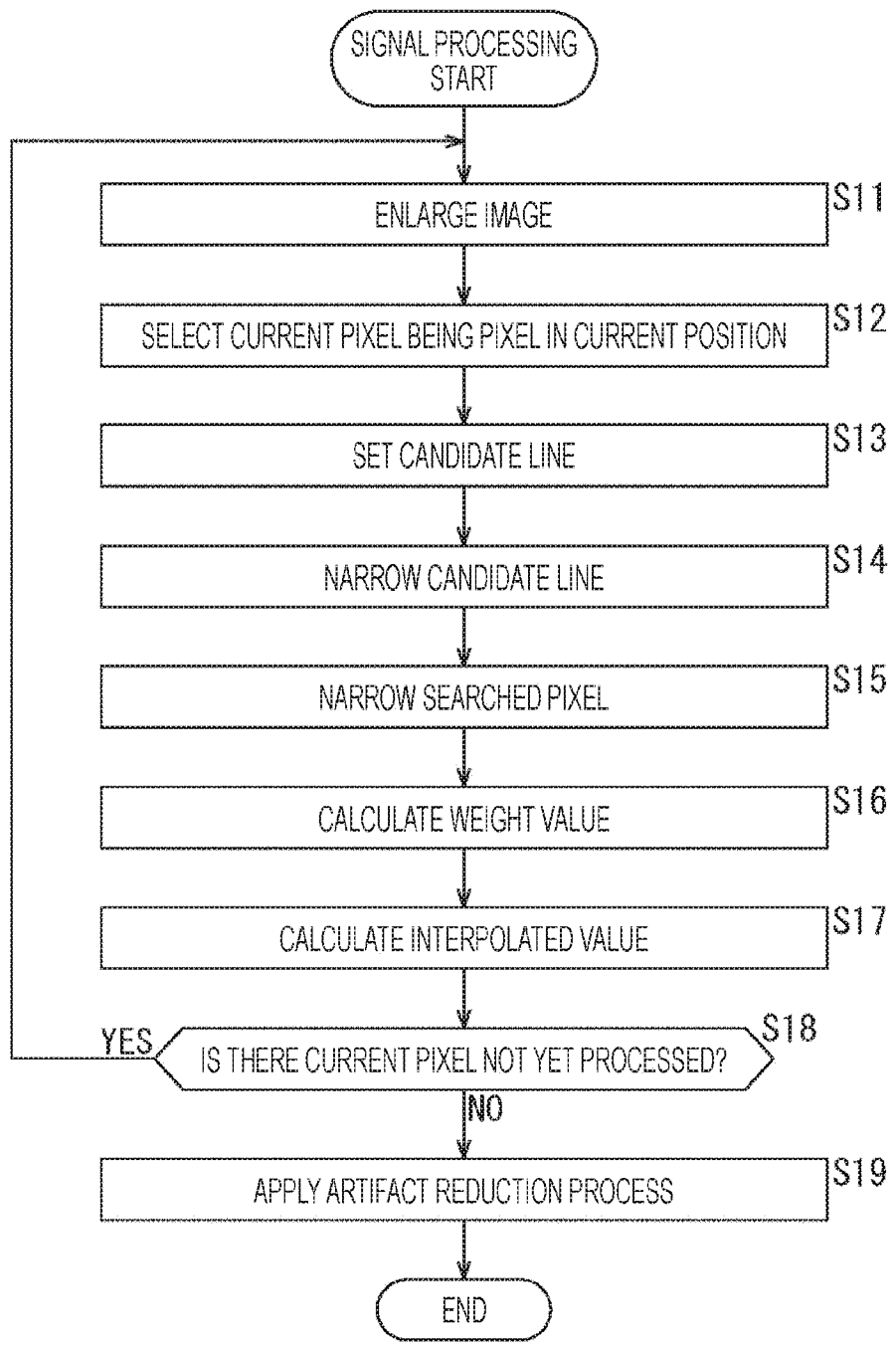
FIG. 9 is a flowchart illustrating signal processing by the signal processor in FIG. 1.

Signal processing by the signal processor 11 in FIG. 1 is next described in detail with reference to a flowchart in FIG. 9.

At step S11, the enlarging unit 31 enlarges the input image P11 to an image at desired magnification. At that time, the enlarged image includes the known pixel included in the input image and the unknown pixel which should be interpolated/generated in association with the enlargement. That is to say, in a case of the image doubled in the horizontal direction and in the vertical direction, for example, the image illustrated in FIG. 2 is generated.

Meanwhile, hereinafter, when the pixel values of the input image are of three colors of red, green, and blue (RGB), for example, an RGB pixel signal is converted to a YUV signal by following equation (1) and a value based on the luminance value Y individually obtained is described as an example of the pixel value. However, it is also possible to process each RGB image or use another pixel value.

[Mathematical Formula 1]

$$\begin{bmatrix} Y \\ U \\ V \end{bmatrix} = \begin{bmatrix} 0.299 & 0.587 & 0.114 \\ -0.14713 & -0.28886 & 0.436 \\ 0.615 & -0.51499 & -0.10001 \end{bmatrix} \begin{bmatrix} R \\ G \\ B \end{bmatrix} \quad (1)$$

Meanwhile, the YUV signal obtained by equation (1) may be converted to the RGB signal by following equation (2).

[Mathematical Formula 2]

$$\begin{bmatrix} R \\ G \\ B \end{bmatrix} = \begin{bmatrix} 1 & 0 & 1.13983 \\ 1 & -0.39465 & -0.5806 \\ 1 & 2.03211 & 0 \end{bmatrix} \begin{bmatrix} Y \\ U \\ V \end{bmatrix} \quad (2)$$

At step S12, the current position selection unit 32 selects the current pixel the pixel value after the enlargement of which is to be obtained. Specifically, the current position selection unit 32 sequentially selects the pixel not yet processed out of the unknown pixels as the current pixel from an upper left pixel in the image by raster scan and the like, for example. Meanwhile, hereinafter, the pixel in the current position (current pixel) selected as the current pixel by the current position selection unit 32 and the pixel value thereof are represented as a pixel L(x,y) and a pixel value L(x,y), respectively.

Figure 7:
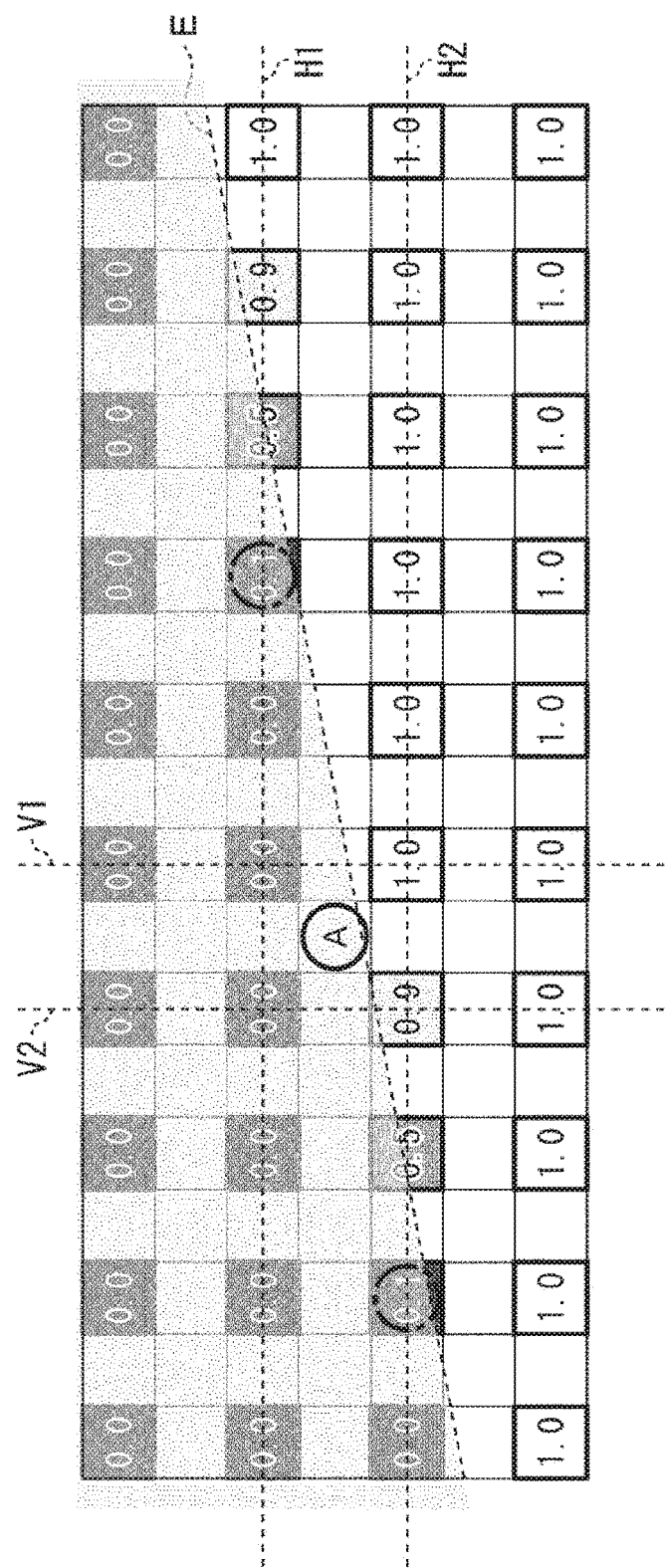
FIG. 7 is a view illustrating an example of setting example a candidate line.

At step S13, the candidate line setting unit 33 sets the candidate lines H1 and H2 in the horizontal direction and the candidate lines V1 and V2 in the vertical direction as illustrated in FIG. 7, for example, on the basis of the current pixel and outputs the same to the candidate line narrowing unit 34.

In more detail, the candidate line setting unit 33 sets the candidate lines H1 and H2 and the candidate lines V1 and V2 so as to be parallel to each other and symmetrical about the current pixel. According to this, it becomes possible to more correctly calculate a degree of expectation that the searched pixel on the candidate line and the current pixel are on the same pattern by the weight value calculation unit 36 on a subsequent stage.

Also, the candidate line setting unit 33 limits the candidate lines H1 and H2 in the horizontal direction and the candidate lines V1 and V2 in the vertical direction to those including two or more known pixels as illustrated in FIG. 7, for example. According to this, it becomes possible to calculate an interpolated value less likely to blur by the interpolated value calculation unit 37 on a subsequent stage.

Therefore, when the current pixel is the pixel L(x,y), the candidate lines H1 and H2 satisfy Y=y+1 and Y=y−1, respectively, for example, and the candidate lines V1 and V2 satisfy X=x+1 and X=x−1, respectively, for example.

At step S14, the candidate line narrowing unit 34 determines the direction of the pattern in which the current pixel is included and narrows the candidate lines H1 and H2 and the candidate lines V1 and V2 set by the candidate line setting unit 33 described above to the candidate lines H1 and H2 or the candidate lines V1 and V2.

For example, when there are a current pixel A and the edge E as illustrated in FIG. 7, the pixel value of the known pixel ideal as the interpolated value of the current pixel A is the pixel value of the pixel on the candidate lines H1 and H2 in the horizontal direction and on the edge E; it is difficult to obtain a desired pixel value from the pixels on the candidate lines V1 and V2 in the vertical direction. The candidate line narrowing unit 34 narrows the candidate line to be scanned according to the pattern to which the current pixel A belongs determined in advance in this manner.

In more detail, the candidate line narrowing unit 34 may use a value used as a threshold used when the weight value calculation unit 36 calculates the weight value by the interpolated value calculation unit 37, for example. Specifically, values $w_{thh}$ and $w_{thv}$ defined by following equations (3) and (4), respectively are calculated to be compared, for example.

[Mathematical Formula 3]

$$w_{thh} = \exp\left(-\frac{\left(Lc_{h0} - \left(\frac{Lmc_{h0}+Lpc_{h0}}{2}\right)\right)^2 + \left(Lc_{h1} - \left(\frac{Lmc_{h1}+Lpc_{h1}}{2}\right)\right)^2 + \left(Lc_{h2} - \left(\frac{Lmc_{h2}+Lpc_{h2}}{2}\right)\right)^2}{3 \times 2\sigma_{rp}^2} - \frac{(L(x,y-3)-L(x,y-1))^2 + (L(x,y-1)-L(x,y+1))^2 + (L(x,y+1)-L(x,y+3))^2}{3 \times 2\sigma_{ip}^2}\right) \quad (3)$$

[Mathematical Formula 4]

$$w_{thv} = \exp\left(-\frac{\left(Lc_{v0} - \left(\frac{Lmc_{v0}+Lpc_{v0}}{2}\right)\right)^2 + \left(Lc_{v1} - \left(\frac{Lmc_{v1}+Lpc_{v1}}{2}\right)\right)^2 + \left(Lc_{v2} - \left(\frac{Lmc_{v2}+Lpc_{v2}}{2}\right)\right)^2}{3 \times 2\sigma_{rp}^2} - \frac{(L(x-3,y)-L(x-1,y))^2 + (L(x-1,y)-L(x+1,y))^2 + (L(x+1,y)-L(x+3,y))^2}{3 \times 2\sigma_{ip}^2}\right) \quad (4)$$

Herein, variations in equations (3) and (4) are defined by following equation (5).

[Mathematical Formula 5]

$$Lc_{h0} = \frac{L(x,y-4)+2L(x,y-2)+L(x,y)}{4} \quad (5)$$

$$Lc_{h1} = \frac{L(x,y-2)+2L(x,y)+L(x,y+2)}{4}$$

$$Lc_{h2} = \frac{L(x,y)+2L(x,y+2)+L(x,y+4)}{4}$$

$$Lmc_{h0} = \frac{L(x,y-5)+2L(x,y-3)+L(x,y-1)}{4}$$

$$Lmc_{h1} = \frac{L(x,y-3)+2L(x,y-1)+L(x,y+1)}{4}$$

$$Lmc_{h2} = \frac{L(x,y-1)+2L(x,y+1)+L(x,y+3)}{4}$$

$$Lpc_{h0} = \frac{L(x,y-3)+2L(x,y-1)+L(x,y+1)}{4}$$

$$Lpc_{h1} = \frac{L(x,y-1)+2L(x,y+1)+L(x,y+3)}{4}$$

$$Lpc_{h2} = \frac{L(x,y+1)+2L(x,y+3)+L(x,y+5)}{4}$$

$$Lc_{v0} = \frac{L(x-4,y)+2L(x-2,y)+L(x,y)}{4}$$

$$Lc_{v1} = \frac{L(x-2,y)+2L(x,y)+L(x+2,y)}{4}$$

$$Lc_{v2} = \frac{L(x,y)+2L(x+2,y)+L(x+4,y)}{4}$$

$$Lmc_{v0} = \frac{L(x-5,y)+2L(x-3,y)+L(x-1,y)}{4}$$

$$Lmc_{v1} = \frac{L(x-3,y)+2L(x-1,y)+L(x+1,y)}{4}$$

$$Lmc_{v2} = \frac{L(x-1,y)+2L(x+1,y)+L(x+3,y)}{4}$$

$$Lpc_{v0} = \frac{L(x-3,y)+2L(x-1,y)+L(x+1,y)}{4}$$

$$Lpc_{v1} = \frac{L(x-1,y)+2L(x+1,y)+L(x+3,y)}{4}$$

$$Lpc_{v2} = \frac{L(x+1,y)+2L(x+3,y)+L(x+5,y)}{4}$$

Figure 10:
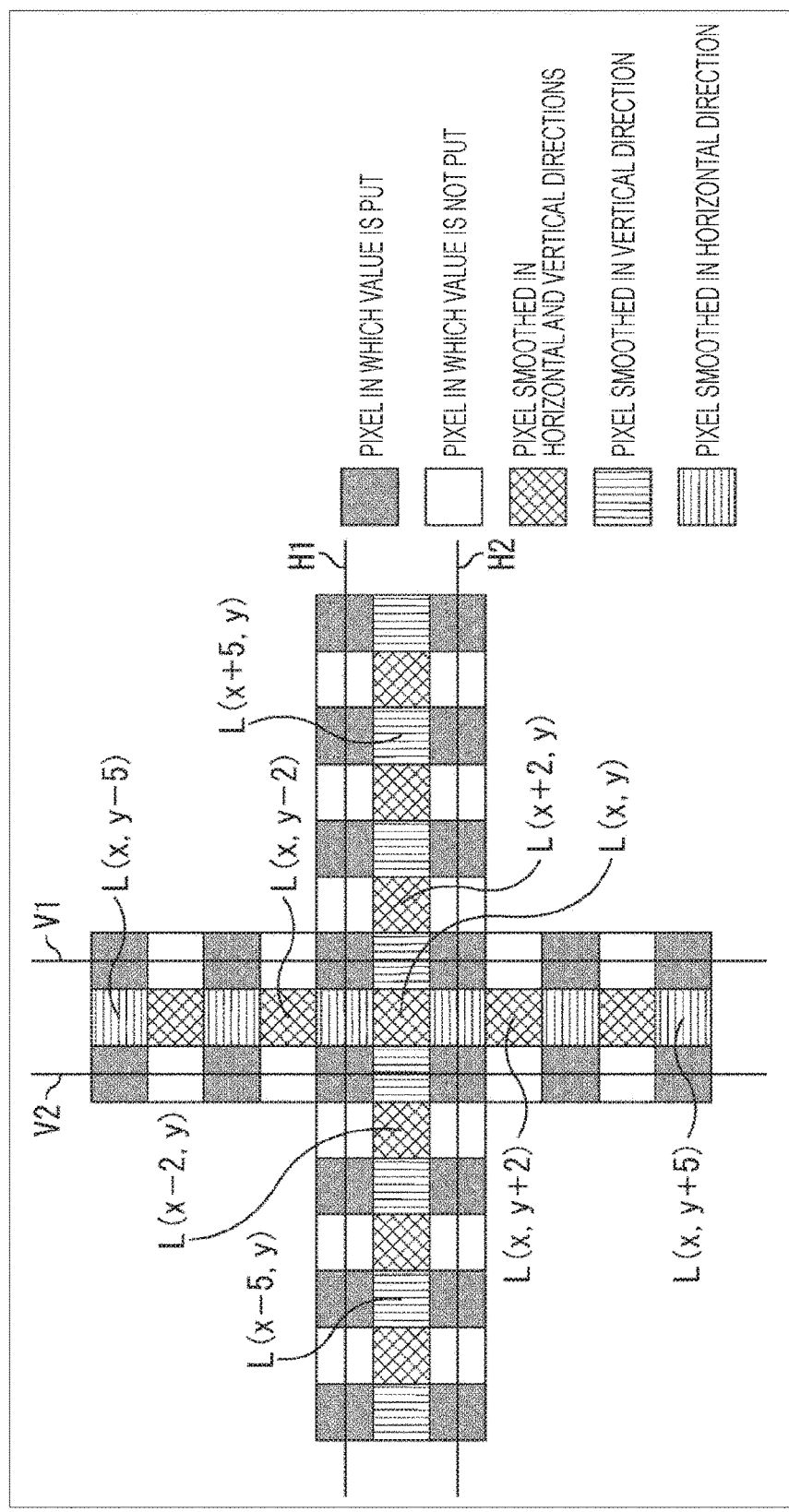
FIG. 10 is a view illustrating definition of pixel arrangement in operation.

Also, a value represented by L(X,Y) is the pixel value of each pixel illustrated in FIG. 10.

Herein, $\sigma_{rp}^2$ and $\sigma_{ip}^2$ in equations (3) and (4) are parameters to be described later when the process by the weight value calculation unit 36 is described. Also, the above-described values $w_{thh}$ and $w_{thv}$ represent similarities between a block formed of adjacent pixels of the current pixel and a block including the current pixel. The weight value calculation unit 36 on the subsequent stage uses them as the thresholds in order not to add the pixel which is less similar than the adjacent block when obtaining the weight value.

The candidate line narrowing unit 34 compares the above-described values $w_{thh}$ and $w_{thv}$ and determines that the current pixel belongs to the pattern in the vertical direction when the value $w_{thh}$ is larger than the value $w_{thv}$ and narrows the candidate lines to the candidate lines V1 and V2 in the vertical direction. Also, the candidate line narrowing unit 34 determines that the current pixel belongs to the pattern in the horizontal direction when the value $w_{thv}$ is larger than the value $w_{thh}$ and narrows the candidate lines to the candidate lines H1 and H2 in the horizontal direction.

The values $w_{thh}$ and $w_{thv}$ calculated above are also used as the thresholds of the weight value calculation unit 36 on the subsequent stage. As illustrated in FIG. 10, the interpolated value interpolated on the basis of the pixels in each of which the pixel value is put adjacent in up and down and right to left directions is used for the pixel the pixel value of which is unknown out of the pixels used in equations (3) and (4).

For example, when there are the pixels the pixel values of which are known adjacent in the up and down direction, a value smoothed by using the known pixel values of the pixels adjacent in the up and down direction is made the interpolated value. Also, when there are the pixels the pixel values of which are known adjacent in the right to left direction, the value smoothed by using the known pixel values adjacent in the right to left direction is made the interpolated value. Furthermore, when there are the pixels the pixel values of which are known adjacent in an oblique direction, the value smoothed by using the known pixel values adjacent in the up and down and right to left directions is made the interpolated value.

This is similar for operation by the searched pixel narrowing unit 35 and the weight value calculation unit 36 on the subsequent stage.

At step S15, the searched pixel narrowing unit 35 narrows the pixel to be scanned on the candidate line according to the pattern of the current pixel and outputs information of the pixel to be scanned to the weight value calculation unit 36.

In more detail, for example, when there are the current pixel A and the edge E illustrated in FIG. 8, the ideal pixels which may be used when interpolating/generating the pixel value of the current pixel A are the pixels on the scan lines (candidate lines) H1 and H2 and on the edge E each indicated by a chain dotted circle in the drawing. On the other hand, it is not possible to obtain the desired pixel value from the pixels in the areas Z21 and Z22 enclosed by the dotted line on the scan lines H1 and H2. That is to say, the pixel in the area Z21 enclosed by the dotted line on the scanning lines H1 and H2 is surrounded by the pixels the pixel value of which is 1.0, so that it is obvious that the pixel value thereof is 1.0. Also, the pixel in the area Z22 is surrounded by the pixels the pixel value of which is 0.0, so that it is obvious that the pixel value thereof is 0.0. From this, it is difficult to use the pixels to obtain the pixel value of the current pixel A.

It is understood that the pixels included in the above-described areas Z21 and Z22 are not necessarily scanned when the pattern to which the current pixel A belongs is determined in advance in this manner. The pattern may be determined by any method; it is possible to roughly determine whether the edge to which the pattern including the current pixel A belongs is descending rightward or leftward by using following equation (6), for example.

[Mathematical Formula 6]

$$ga = \sum_{i=0}^{2} (|Lmc_{hi} - Lmc_{vi}| + |Lpc_{hi} - Lpc_{vi}|) \quad (6)$$

$$gd = \sum_{i=0}^{2} (|Lmc_{hi} - Lpc_{vi}| + |Lpc_{hi} - Lmc_{vi}|)$$

Figure 11:
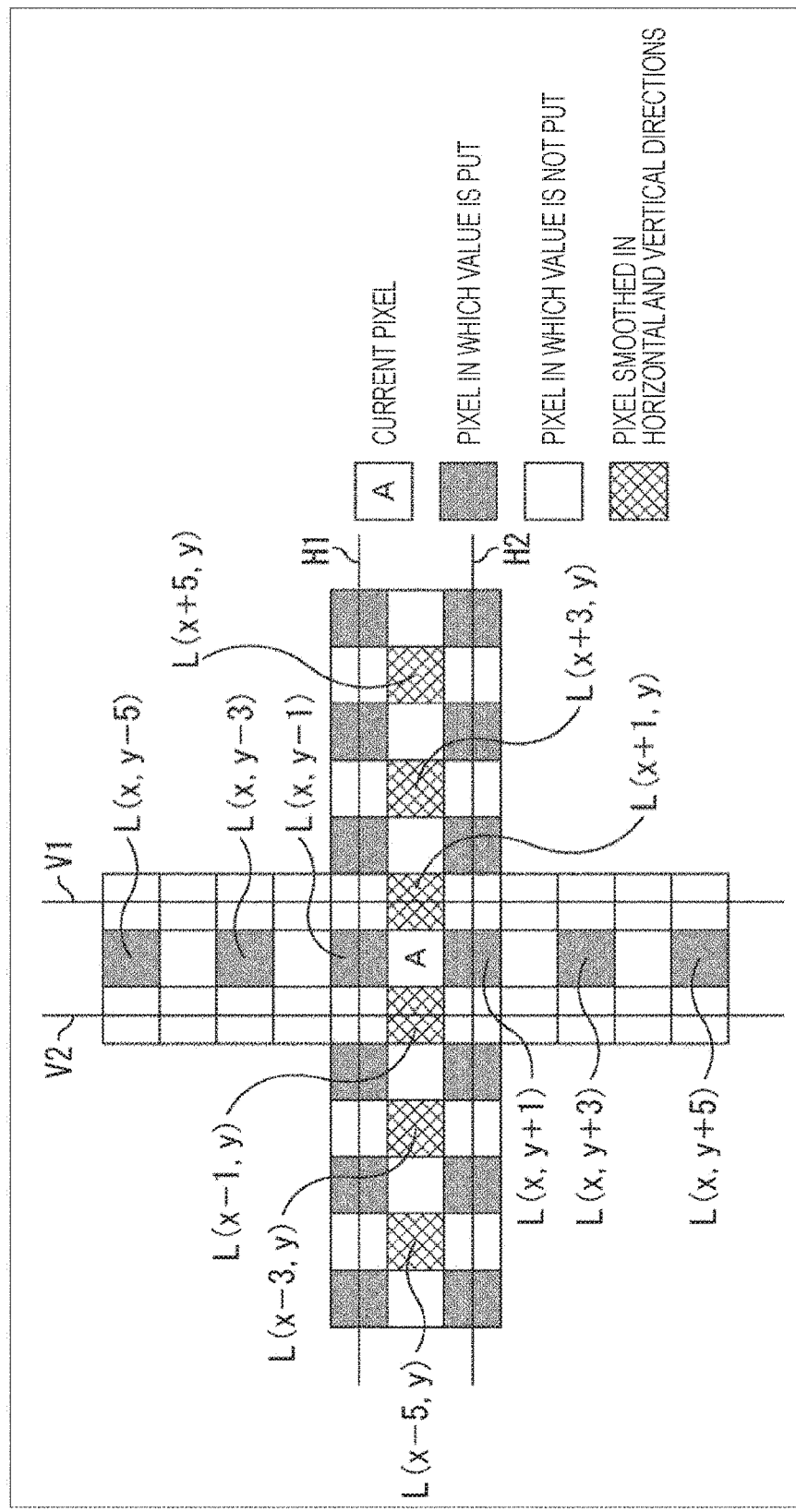
FIG. 11 is a view illustrating the definition of the pixel arrangement in the operation.

Herein, the current pixel A is the L(x,y) pixel and other L(X,Y) pixels are as illustrated in FIG. 11. Also, a value ga represents a rightward descending degree and a value gd represents a rightward ascending degree.

That is to say, when the value ga is larger than the value gd (ga>gd), the pattern is regarded to be descending rightward, and on the other hand, when the value gd is larger than the value ga (ga<gd), the pattern is regarded to be ascending rightward. The searched pixel narrowing unit 35 narrows the scanned pixel on the basis of magnitude relationship of the values gd and ga. More specifically, for example, as for the scanned pixel on the candidate line H1, when a variable t representing a relative distance from a scanning central position satisfies $-10 \le t \le 10$, the searched pixel narrowing unit 35 narrows the variable t to $-10 \le t \le 0$ in a case of rightward descending, and on the other hand, this narrows the variable t to $0 \le t \le 10$ in a case of rightward ascending.

At step S16, the weight value calculation unit 36 calculates a degree of expectation that each pixel position on the candidate line is located on the same pattern as that of the current position, that is to say, similarity between the pattern of each pixel position on the candidate line and the pattern of the current position as the weight value. More specifically, the weight value calculation unit 36 calculates the weight value by using a sum of squared difference (SSD), a sum of absolute difference (SAD) and the like, for example.

The weight value calculation unit 36 may also calculate a weight value w(t) in the following manner from similarity between the current pixel and the searched pixel (opposite phases) and the similarity between the blocks of the searched pixels (same phase) located in positions symmetrical about the current pixel on the basis of a method used in Patent Document 2 (Japanese Patent Application Laid-Open No. 2012-234507) described above, for example. For example, when the candidate line narrowing unit 33 narrows to the scanning in the horizontal direction, the weight value calculation unit 36 calculates the weight value w(t) by block matching of one pixel by five pixels in which the known pixel value is included every other pixel orthogonal to the candidate lines H1 and H2 as illustrated in following equation (7).

[Mathematical Formula 7]

$$w(t) = \exp\left(-\frac{(Lc_{h0} - Lm(t)_{h0})^2 + (Lc_{h1} - Lm(t)_{h1})^2 + (Lc_{h2} - Lm(t)_{h2})^2}{3 \times 2\sigma_{rp}^2} - \frac{(Lc_{h0} - Lp(t)_{h0})^2 + (Lc_{h1} - Lp(t)_{h1})^2 + (Lc_{h2} - Lp(t)_{h2})^2}{3 \times 2\sigma_{rp}^2} - \frac{\left(\frac{L(x+t, y-3) - L(x-t, y-1)}{}\right)^2 + \left(\frac{L(x+t, y-1) - L(x-t, y+1)}{}\right)^2 + \left(\frac{L(x+t, y+1) - L(x-t, y+3)}{}\right)^2}{3 \times 2\sigma_{ip}^2}\right) - w_{th_h} \quad (7)$$

Figure 12:
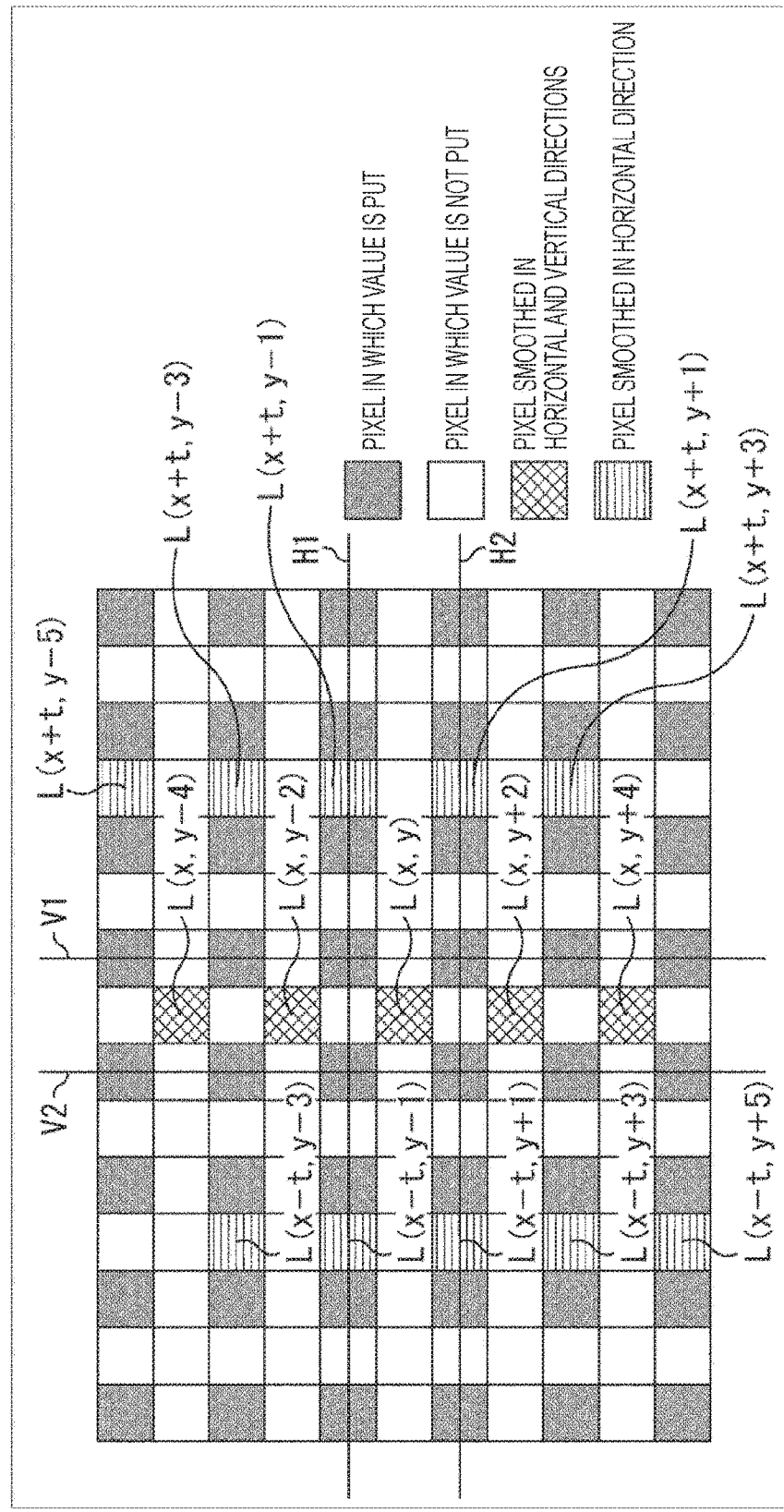
FIG. 12 is a view illustrating the definition of the pixel arrangement in the operation.

Herein, L(X,Y) in equation (7) represents the pixel value of each pixel illustrated in FIG. 12 and t represents the variable indicating the relative distance from the scanning central position.

Also, the variable in equation (7) is defined by following equation (8).

[Mathematical Formula 8]

$$Lm(t)_{h0} = \frac{L(x+t, y-5) + 2L(x+t, y-3) + L(x+t, y-1)}{4} \quad (8)$$

$$Lm(t)_{h1} = \frac{L(x+t, y-3) + 2L(x+t, y-1) + L(x+t, y+1)}{4}$$

$$Lm(t)_{h2} = \frac{L(x+t, y-1) + 2L(x+t, y+1) + L(x+t, y+3)}{4}$$

$$Lp(t)_{h0} = \frac{L(x-t, y-3) + 2L(x-t, y-1) + L(x-t, y+1)}{4}$$

$$Lp(t)_{h1} = \frac{L(x-t, y-1) + 2L(x-t, y+1) + L(x-t, y+3)}{4}$$

$$Lp(t)_{h2} = \frac{L(x-t, y+1) + 2L(x-t, y+3) + L(x-t, y+5)}{4}$$

$$Lm(t)_{v0} = \frac{L(x-5, y+t) + 2L(x-3, y+t) + L(x-1, y+t)}{4}$$

$$Lm(t)_{v1} = \frac{L(x-3, y+t) + 2L(x-1, y+t) + L(x+1, y+t)}{4}$$

$$Lm(t)_{v2} = \frac{L(x-1, y+t) + 2L(x+1, y+t) + L(x+3, y+t)}{4}$$

$$Lp(t)_{v0} = \frac{L(x-3, y-t) + 2L(x-1, y-t) + L(x+1, y-t)}{4}$$

$$Lp(t)_{v1} = \frac{L(x-1, y-t) + 2L(x+1, y-t) + L(x+3, y-t)}{4}$$

$$Lp(t)_{v2} = \frac{L(x+1, y-t) + 2L(x+3, y-t) + L(x+5, y-t)}{4}$$

Also, when it is narrowed to the scanning in the vertical direction, the weight value is calculated such that the weight value w(t) is calculated by the block matching of one pixel by five pixels in which the known pixel value is included every other pixel orthogonal to the candidate lines V1 and V2 by following equation (9).

[Mathematical Formula 9]

$$w(t) = \exp\left(-\frac{(Lc_{v0} - Lm(t)_{v0})^2 + (Lc_{v1} - Lm(t)_{v1})^2 + (Lc_{v2} - Lm(t)_{v2})^2}{3 \times 2\sigma_{rp}^2} - \frac{(Lc_{v0} - Lp(t)_{v0})^2 + (Lc_{v1} - Lp(t)_{v1})^2 + (Lc_{v2} - Lp(t)_{v2})^2}{3 \times 2\sigma_{rp}^2} - \frac{\left(\frac{L(x-3, y+t) -}{L(x-1, y-t)}\right)^2 + \left(\frac{L(x-1, y+t) -}{L(x+1, y-t)}\right)^2 + \left(\frac{L(x+1, y+t) -}{L(x+3, y-t)}\right)^2}{3 \times 2\sigma_{ip}^2}\right) - w_{thv}$$
(9)

When the weight value w(t) calculated by equation (7) or (9) takes a negative value, the weight value calculation unit 36 makes the weight value w(t)=0. Values $\sigma_{rp}^2$, $\sigma_{ip}^2$ are parameters which determine severity of opposite phase determination and same phase determination. That is to say, the pixel of the block with a larger weight value w(t) is more likely to be added and that with a smaller value is less likely to be added.

When the weight value w(t) is calculated as in equation above, by subtracting the thresholds (values $w_{thh}$ and $w_{thv}$), the pixel value of the block which is less similar than the adjacent pixel has a weight of 0 and this is not added.

Figure 13:
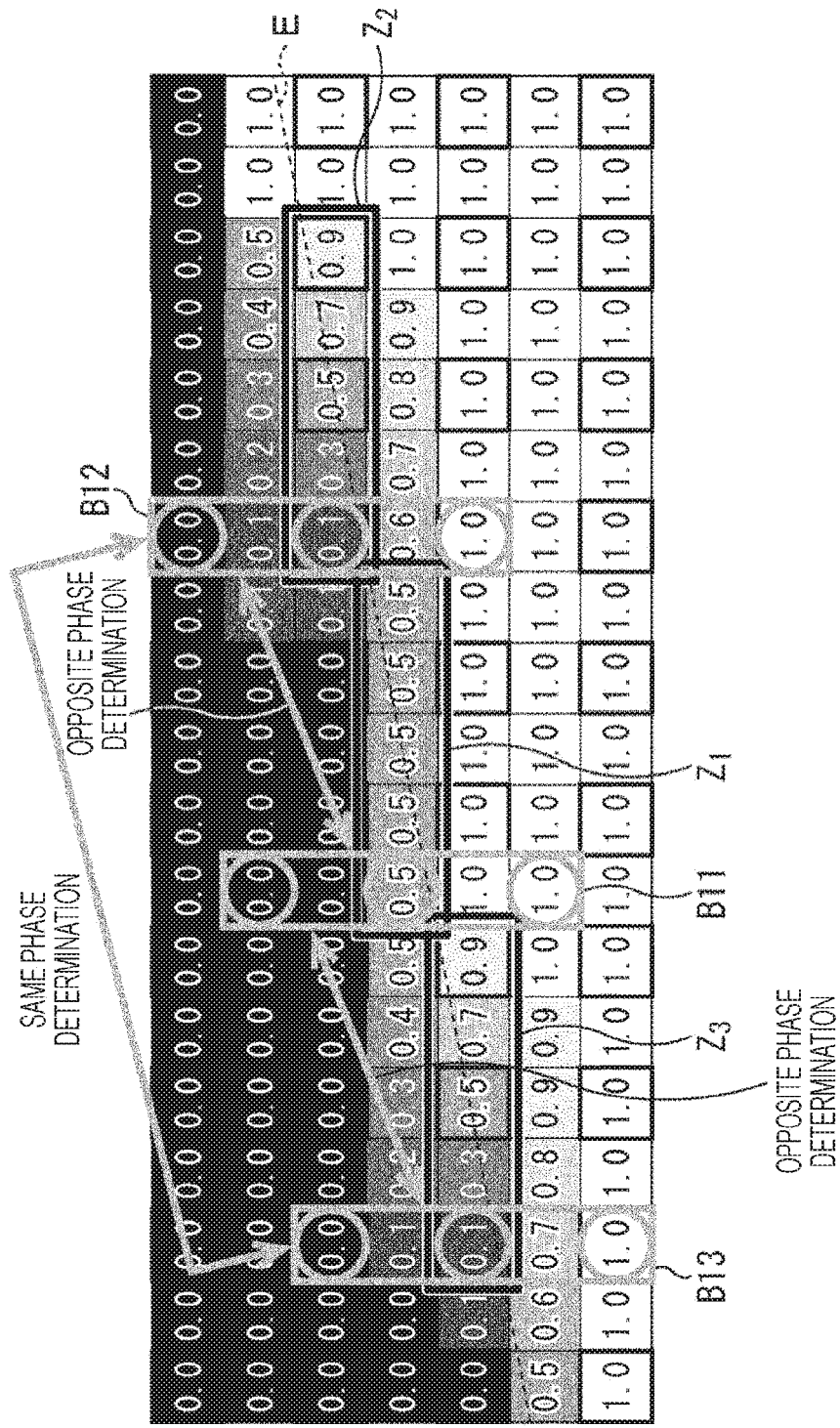
FIG. 13 is a view illustrating an operation method of a weight value based on similarity between a block including a current pixel and two blocks in an opposite phase and at the same distance therefrom.

The block of the searched pixel in the phase opposite to that of the block including the pixel in the current position (current pixel) and the blocks of the searched pixels in the same phase symmetrical about the pixel in the current position are herein described. As described above, when there is the edge E, the block of the same pattern periodically appears along the edge E. Therefore, as illustrated in FIG. 13 in which pixel arrangement is the same as that in FIG. 5, when a block B11 of one pixel by five pixels including the current pixel is considered, there should be blocks B12 and B13 of one pixel by five pixels in the same phase, the blocks in the phase opposite to that of the block B11 at the same distance from the block B11. That is to say, the pixel value of the current pixel belonging to the block B11 is not the same pixel value as the pixel values of the corresponding pixels of the blocks B12 and B13 and this is in the opposite phase in consideration of the periodicity. The weight value calculation unit 36 puts the weight value corresponding to the value of expectation indicating that each pixel on the candidate line in such relationship is the current pixel.

Meanwhile, a scanning interval may be performed not every pixel but every three pixels. In this case, it is possible to reduce a calculation amount by deterioration of accuracy.

Figure 14:
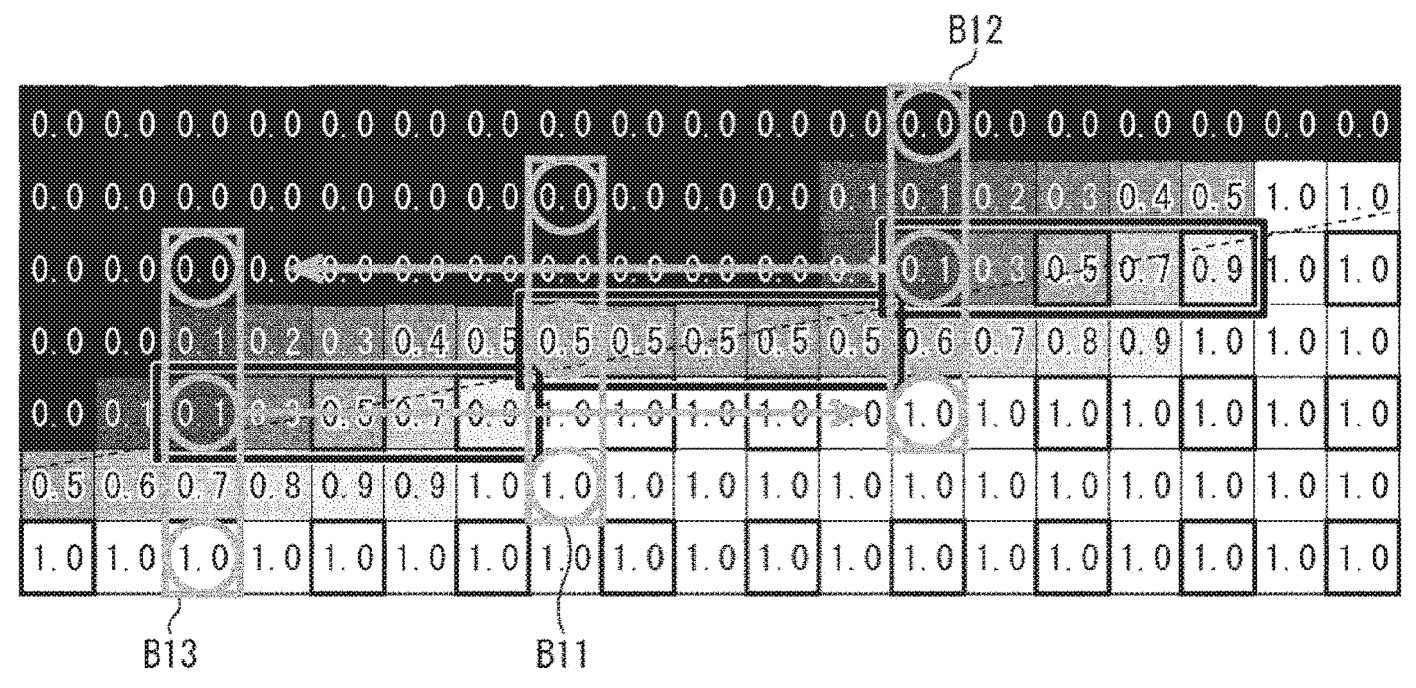

At step S17, the interpolated value calculation unit 37 obtains the weighted addition of the weight value obtained by the weight value calculation unit 36 and a central pixel value of a reference block on the candidate line, calculates the interpolated pixel value by dividing the same by a sum of the weight values, and outputs the same to the artifact reduction unit 38. As illustrated in FIG. 14, there are two central pixel values of the reference blocks in symmetrical positions about the block including the current pixel, so that an average value l(t) of them is made the pixel value to be added.

Specifically, in a case of scanning in the horizontal direction, the interpolated value calculation unit 37 makes the average value l(t) represented by following equation (10) a reference pixel average value.

[Mathematical Formula 10]

$$l(t) = \frac{L(x+t, y-1) + L(x-t, y+1)}{2} \quad (10)$$

Also, in a case of scanning in the vertical direction, the interpolated value calculation unit 37 makes the average value l(t) represented by following equation (11) the reference pixel average value.

[Mathematical Formula 11]

$$l(t) = \frac{L(x-1, y+t) + L(x+1, y-t)}{2} \quad (11)$$

As a result, the interpolated value calculation unit 37 calculates an interpolated pixel value $L_{new}$ of the current pixel by operation represented by following equation (12) by the weighted addition of the weight obtained by the weight calculation unit and the reference pixel average value.

[Mathematical Formula 12]

$$L_{new} = \frac{\sum l(t)w(t)}{\sum w(t)} \quad (12)$$

At step S18, the enlarging unit 31 determines whether there is the pixel not yet processed which is not processed as the current pixel, and when this is present, the procedure returns to step S11 and the subsequent processes are repeated. Then, when it is regarded that there is no pixel not yet processed at step S18, the procedure shifts to step S19.

At step S19, the artifact reduction unit 38 applies an artifact reduction process to the image the interpolated pixel value of which supplied from the interpolated value calculation unit 37 is obtained and outputs the same as the output image.

In more detail, the artifact reduction unit 38 updates an entire image by the interpolated/generated pixel value and reduces a high-frequency artifact by the weighted addition using peripheral pixels for the updated current pixel. A process of reducing the high-frequency artifact by the weighted addition using the peripheral pixels is specifically a filter process, for example.

A filter used in the process herein is not especially limited, but the filter which cuts a high frequency near a Nyquist frequency fs/2 is desirably used. When the image is doubled in the horizontal direction and in the vertical direction, this band is not essentially present and may be classified as the artifact.

As the filter, a two-dimensional finite impulse response (FIR) filter as illustrated in FIG. 15 which reduces the high frequency while maintaining a low band as much as possible is used, for example. The two-dimensional FIR filter may be created by synthesis of one-dimensional FIR filters [−1 4 10 4 −1]. Also, the weighted addition of the weight w(x,y) and the pixel value L(x,y) in adjacent five pixels by five pixels illustrated in FIG. 15 is represented by following equation (13) when the current pixel position is (x,y).

[Mathematical Formula 13]

$$L(x, y)_{new} = \sum_{i=0}^{4} \sum_{j=0}^{4} L(x-2+i, y-2+j)w(i, j) \quad (13)$$

As described above, when interpolating/generating the pixel, the procedure is progressed while narrowing current candidate lines by determining whether the pixel belongs to the horizontal direction or the vertical direction. Therefore, it is possible to interpolate/generate the pixel value while selecting the known pixel appropriate for the interpolation/generation, so that it becomes possible to interpolate/generate the appropriate pixel value while reducing the calculation amount.

Also, the procedure is progressed after narrowing the searched pixels. Therefore, it is possible to interpolate/generate the pixel value while selecting the known pixel appropriate for the interpolation/generation, so that it becomes possible to interpolate/generate the appropriate pixel value while reducing the calculation amount.

Furthermore, the weight value according to the similarity of the blocks at the same distance from the current pixel in the same phase, the blocks in the phase opposite to the phase of the current pixel are set and the pixel value is interpolated/generated by a sum of products (weighted addition) by using the known pixel value and the weight value by the block matching using the current block including the current pixel, so that it becomes possible to appropriately interpolate/generate the pixel value by using the periodicity of the image.

Also, the process of reducing the artifact from relationship between the interpolated/generated pixel and the peripheral pixels is applied, so that it becomes possible to interpolate/generate a more natural pixel value in which the artifact is reduced.

<First Variation>

Figure 16:
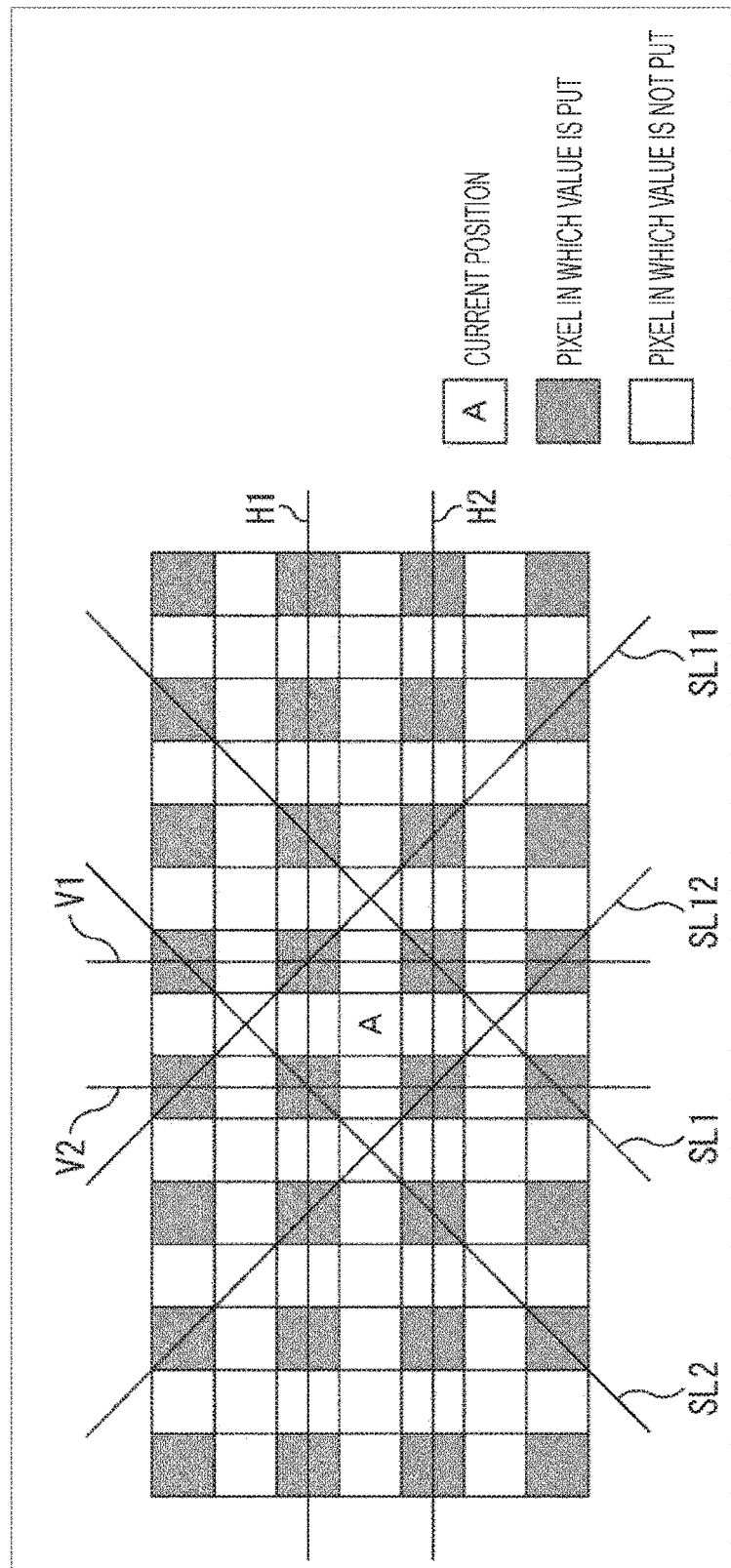
FIG. 16 is a view illustrating a first variation.

An example of setting groups of two candidate lines in each of a horizontal direction and a vertical direction and narrowing them to one group by a candidate line narrowing unit 33 is described above. However, it is not required to limit the direction and the number of lines. That is to say, it is also possible to provide candidate lines SL1 and SL2, and candidate lines SL11 and SL12 in oblique directions at 45 degrees and 135 degrees, respectively, as illustrated in FIG. 16, and further set them in an arbitrary direction.

For example, it is also possible that a total of four groups of lines in the horizontal direction, in the vertical direction, and in two oblique directions are made the candidate lines and only that in the vertical direction is excluded at the time of candidate narrowing to narrow to the three groups of lines. In this case, when scanning for calculating a weight value, it is preferable to perform block matching by using an elongated block of one pixel by five pixels in a direction orthogonal to the direction of the candidate line.

Also, when there is a plurality of groups of candidate lines after the candidate lines are narrowed in the above-described manner, it is also possible to save a result of the weight value and an interpolated value in each candidate line and adopt the interpolated value of the line with the largest weight value after the scanning of all the candidate lines is finished. When the number of candidate lines is increased in this manner, a calculation amount increases; however, it becomes possible to improve performance.

<Second Variation>

Figure 17:
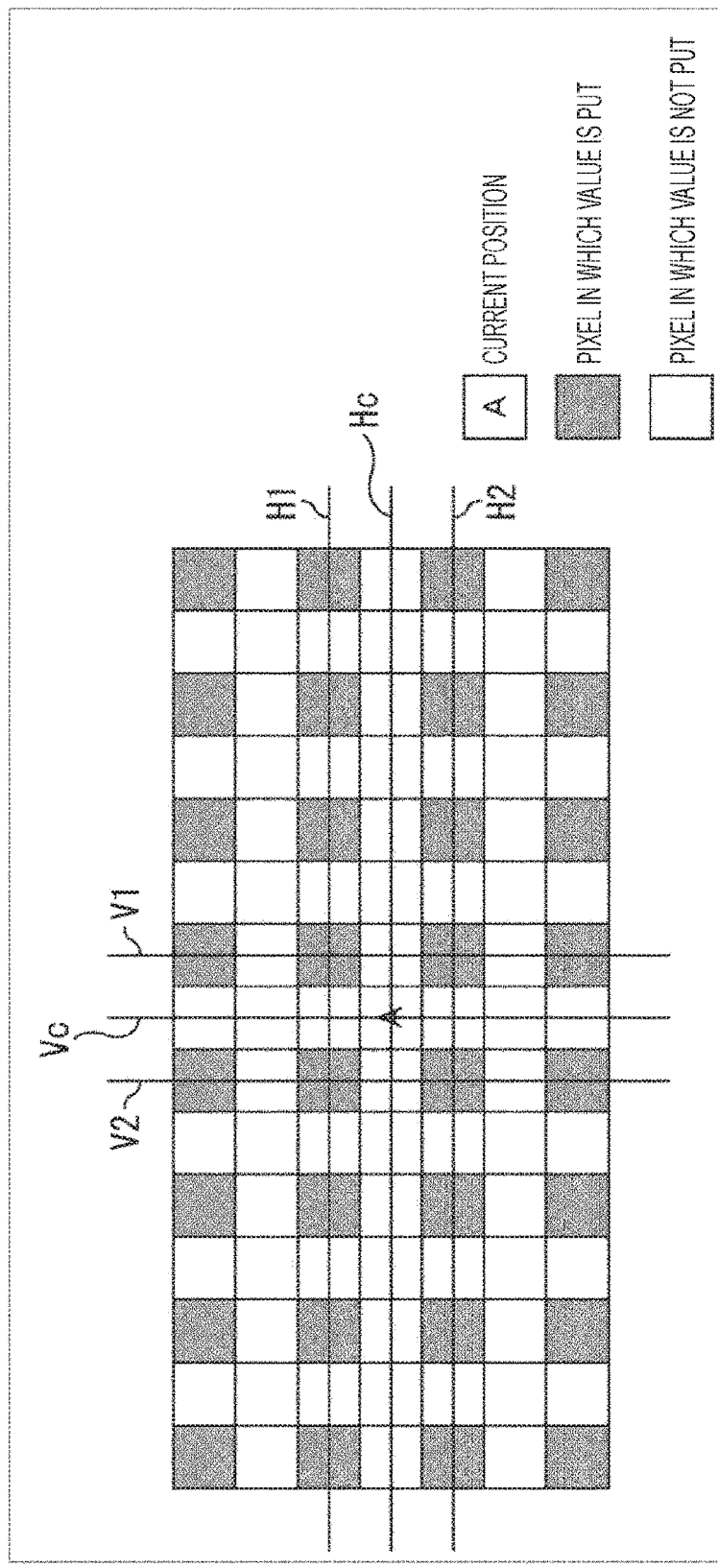
FIG. 17 is a view illustrating a second variation.

Furthermore, although lines which do not include a pixel value of a current pixel itself are set as a group of candidate lines above, it is also possible to set candidate lines Hc, Vc and the like including the current pixel as illustrated in FIG. 17. In this case, the line symmetrical to the current pixel is the line of itself, so that there is no group of lines but only one line and pixels in symmetrical positions on the same line are obtained to be searched from both ends of the line. This case may correspond to a case in which a pattern is completely in a horizontal direction or in a vertical direction. When the number of candidate lines is increased in this manner, a calculation amount increases; however, it becomes possible to improve performance.

<Third Variation>

Although an example of applying a uniform interpolation/generation process for each pixel is described above, it is also possible to use pixel values calculated by different interpolation methods according to a pattern to which each pixel belongs, for example. For example, when an edge is used as the pattern to which each pixel belongs, an interpolated value may be calculated by detailed interpolation operation described above when the pixel does not belong to the edge, and a simply interpolated/generated pixel value may be used as-is for the pixel which does not belong to the edge, thereby speeding up the process.

Figure 18:
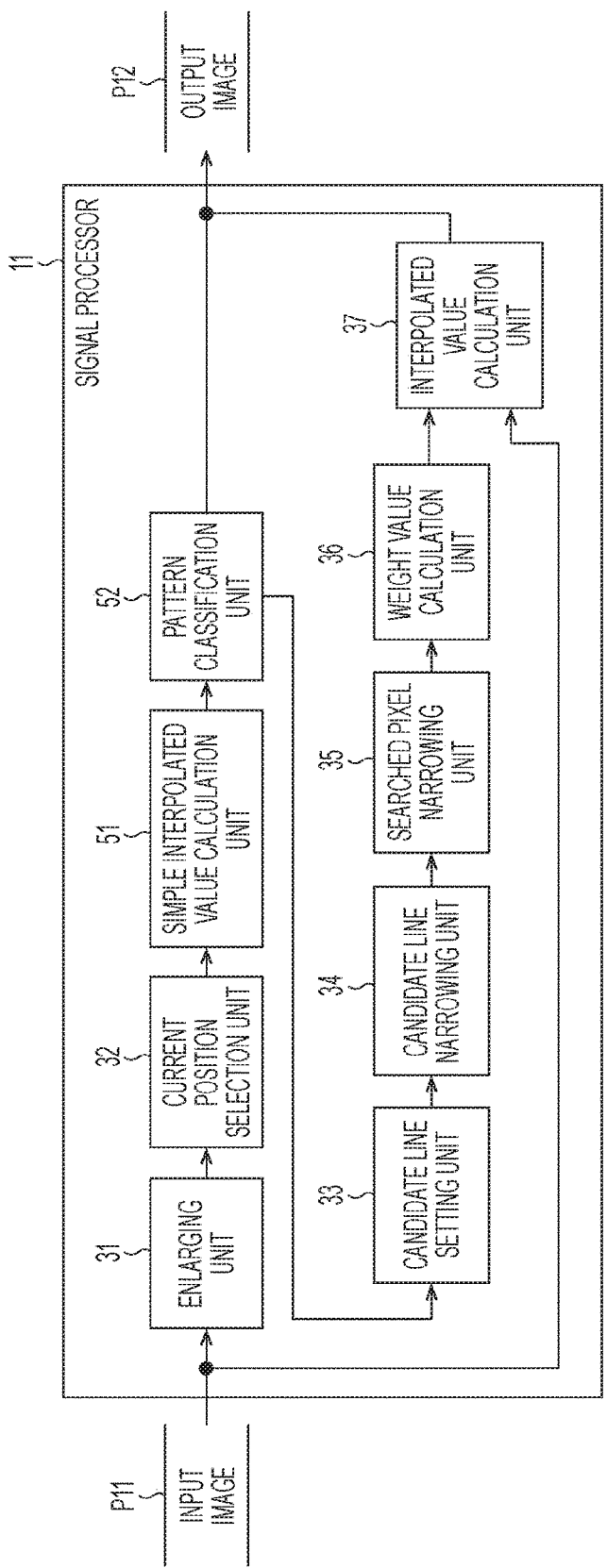
FIG. 18 is a view illustrating a configuration example of a signal processor in a third variation.

FIG. 18 illustrates a configuration of a signal processor which uses the simply interpolated/generated pixel value as-is for the pixel for which simple interpolation/generation is sufficient according to the pattern to which each pixel belongs. Meanwhile, the configuration having the same function as that of a signal processor 11 in FIG. 1 is assigned with the same name and same reference sign and the description thereof is appropriately omitted.

That is to say, the signal processor 11 in FIG. 18 is different from the signal processor 11 in FIG. 1 in that a simple interpolated value calculation unit 51 and a pattern classification unit 52 are provided between a current position selection unit 32 and an interpolated line setting unit 33.

The simple interpolated value calculation unit 51 simply calculates the pixel value of a current pixel by smoothing by using a pixel in a current position and a known pixel around the same to output the same to the pattern classification unit 52.

Figure 19:
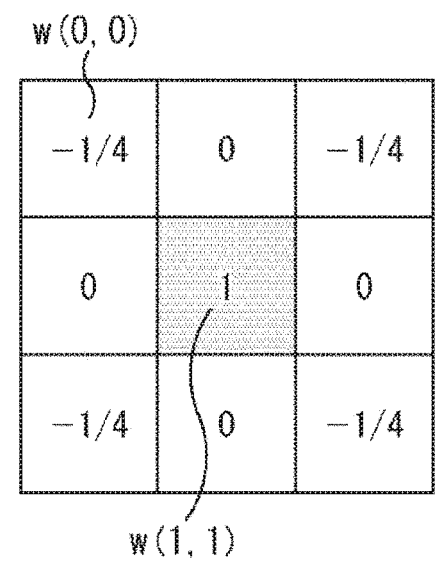

The pattern classification unit 52 detects a high-frequency edge area and determines whether it is required to obtain not a simple interpolated value but a detailed interpolated value. The pattern classification unit 52 applies a filter of three pixels by three pixels formed of a HPF (BPF) which passes only a frequency band in which jaggies are likely to occur around the current position as illustrated in FIG. 19, for example. Then, when the pattern classification unit 52 determines that a filter processing result is not smaller than a predetermined value and the area is the edge area, this regards that the simple interpolated value is sufficient and it is not required to obtain the detailed interpolated value. That is to say, if the pixel is on the edge, it is regarded that the pixel value thereof is a known value and the simply obtained pixel value is sufficient, so that the detailed interpolated value is not required, and the simple interpolated value is output as-is. On the other hand, when the filter processing result is smaller than the predetermined value and the pixel is not regarded to be on the edge, a generation process of a detailed interpolated pixel value is executed by the units subsequent to the candidate line setting unit 33.

<Second Signal Processing>

Figure 20:
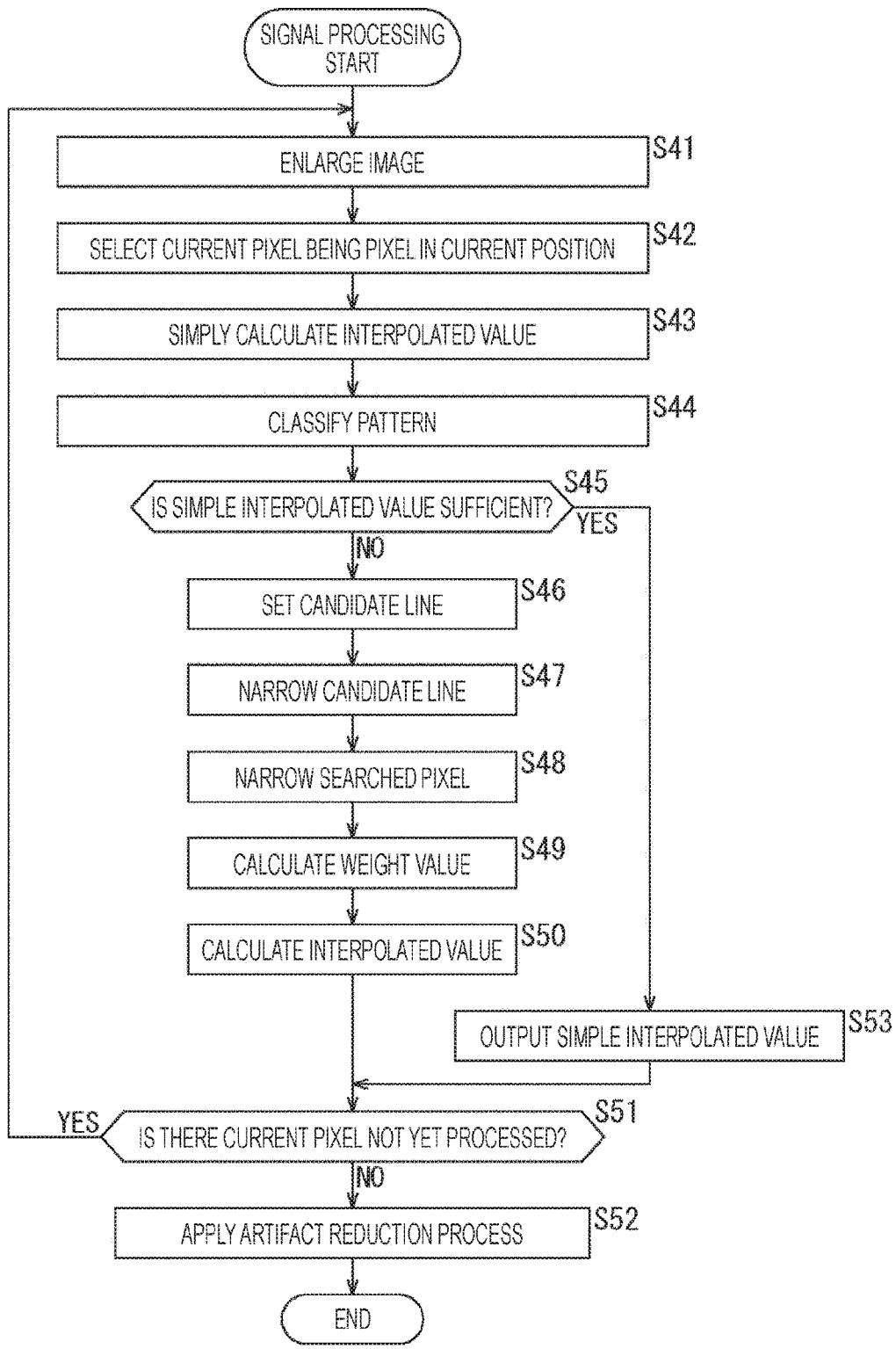
FIG. 20 is a flowchart illustrating signal processing by the signal processor in FIG. 19.

Image processing by the signal processor 11 in FIG. 18 is next described with reference to a flowchart in FIG. 20. Meanwhile, steps S41, S42, and S46 to S52 in FIG. 20 are similar to processes described reference to a flowchart in FIG. 9, so that the description thereof is omitted.

At steps S41 and S42, when an image is enlarged and a current pixel is set, the procedure shifts to step S43.

At step S43, the simple interpolated value calculation unit 51 calculates the interpolated pixel value of the current pixel by a simple method and supplies the same to the pattern classification unit 52.

At step S44, the pattern classification unit 52 classifies the pattern to which the input current pixel belongs. The pattern classification unit 52 applies the process of the filter of three pixels by three pixels as illustrated in FIG. 19, for example, and executes the filter process indicating whether the pixel is on the edge. More specifically, the pattern classification unit 52 executes operation represented by following equation (14), thereby executing the filter process.

[Mathematical Formula 14]

$$L(x, y)_{new} = \sum_{i=0}^{2} \sum_{j=0}^{2} L(x-1+i, y-1+j) w(i, j) \quad (14)$$

Herein, w(x,y) represents a weight value and L(x,y) represents a pixel value of a current pixel (x,y).

At step S45, the pattern classification unit 52 determines whether the simple interpolated pixel value is sufficient on the basis of whether the pattern of the current pixel is classified to be on the edge on the basis of the filter processing result, and when this is not on the edge and the detailed interpolated pixel value is required, the procedure shifts to processes after step S47 and the detailed interpolated pixel value is calculated.

On the other hand, when it is regarded that the current pixel is on the edge at step S45, the procedure shifts to step S53.

At step S53, the pattern classification unit 52 outputs the simply obtained interpolated pixel value as-is.

By such process, it is not required to interpolate/generate the pixel value in detail for the pixel on the edge for which the simple interpolated pixel value is sufficient, so that a processing load may be reduced, and as a result, a processing speed may be improved.

Meanwhile, an example in which the two types of interpolated pixel values by the method of calculating the detailed interpolated pixel value and the method of calculating the simple interpolated pixel value are switched according to the classification of the pattern is described in this variation, it is also possible to switch methods of calculating more interpolated pixel values according to the classification of the pattern.

<Fourth Variation>

An example of determining whether to output a simple interpolated pixel value as-is or to further calculate an interpolated pixel value in detail on the basis of whether a pattern of a current pixel is an edge is described above. However, when there is allowance in operation processing ability of hardware, it is also possible to obtain a simple interpolated pixel generation process and a detailed interpolated pixel value generation process in parallel and selectively output according to the pattern of the current pixel.

Figure 21:
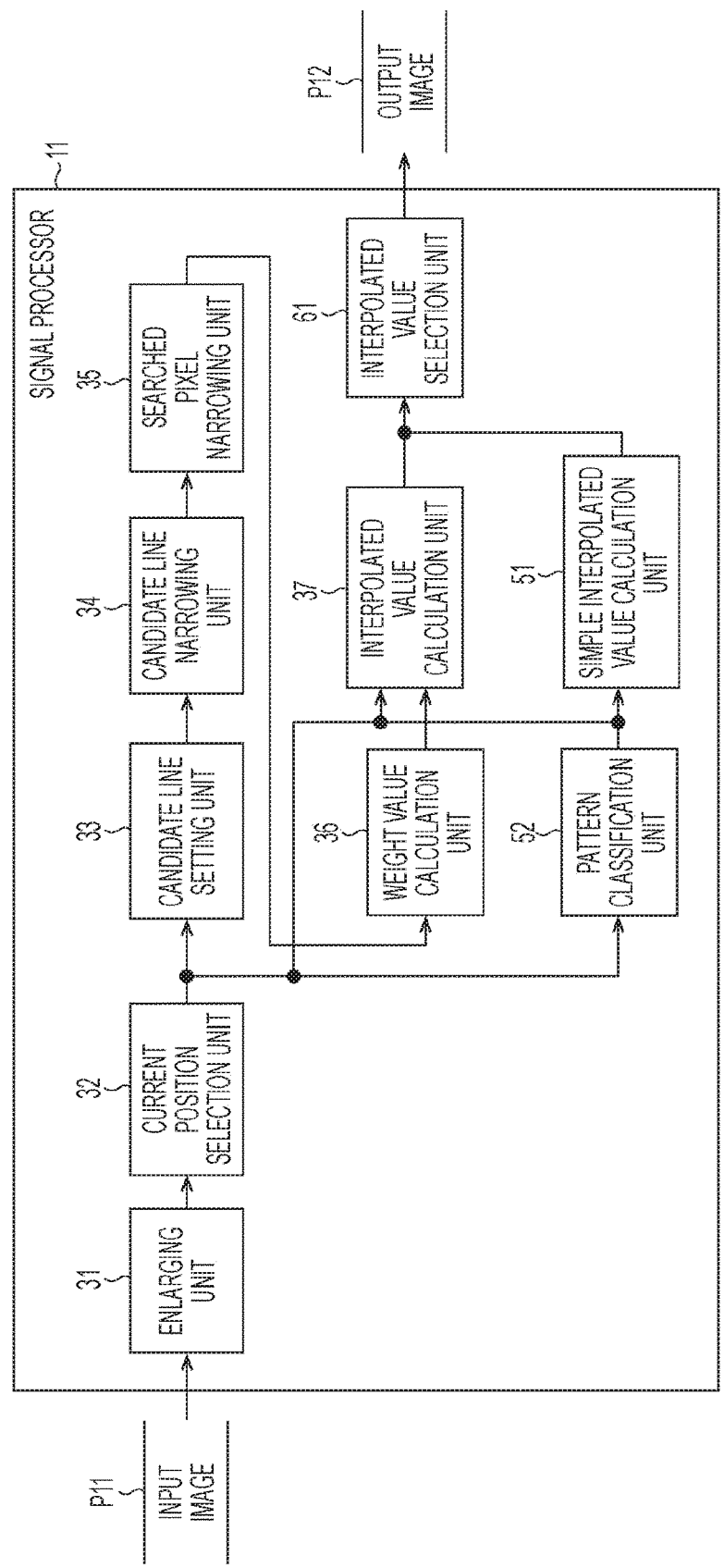
FIG. 21 is a view illustrating a configuration example of a signal processor in a fourth variation.

FIG. 21 is a configuration example of a signal processor 11 which obtains the simple interpolated pixel generation process and the detailed interpolated pixel value generation process in parallel and selects according to the pattern of the current pixel. Meanwhile, in FIG. 21, a configuration having the same function as the configuration of the signal processor 11 in FIG. 18 or FIG. 1 is assigned with the same name and same reference sign and the description thereof is appropriately omitted.

The signal processor 11 in FIG. 21 is different from the signal processor 11 in FIG. 18 in that information of the current pixel output from a current position selection unit 32 is output to both a candidate line setting unit 33 and a pattern classification unit 52, a simple interpolated value calculation unit 51 is provided on a subsequent stage, and further an interpolated value selection unit 61 is provided at the end.

That is to say, after the pattern classification unit 52 classifies the pattern of the current pixel, this is supplied to the simple interpolated value calculation unit 51 and an interpolated value calculation unit 37. Then, the simple interpolated value calculation unit 51 and the interpolated value calculation unit 37 calculate the simple interpolated pixel value and the interpolated pixel value by the detailed process, respectively, for all the pixels and supply them to the interpolated value selection unit 61 with a pattern classification result attached. The interpolated value selection unit 61 selectively outputs the simple interpolated pixel value or the detailed interpolated pixel value according to the classification result of the pattern classification unit 52.

Meanwhile, image processing by the signal processor 11 in FIG. 21 only outputs the simple interpolated pixel value when the current pixel is on the edge and outputs the detailed interpolated pixel value when this is not on the edge at the end on the basis of the classification result of the pattern classification unit 52, that is to say, herein, the result whether the current pixel is on the edge and other processes are similar to the above-described processes, so that the description thereof is omitted.

As described above, the present technology makes it possible to interpolate the pixel value without occurrence of jaggies and without blurring the image. Also, candidate lines to be searched are narrowed and then searched pixels on the candidate line are narrowed before processing, so that a calculation amount may be reduced, an operation load may be reduced, and a high-speed process may be realized. Furthermore, weighted addition of the pixel value of the pixel which is not required may be inhibited by usage of values $w_{thh}$ and $w_{thv}$ as thresholds, so that it becomes possible to improve calculation accuracy of the interpolated pixel value. Also, an original pixel value is maintained for the pixel other than the interpolated pixel, so that extra high-frequency artifact may be reduced.

<Application Example to Electronic Device>

The above-described signal processor may be formed separately from a solid-state image sensor or may be built in the solid-state image sensor, for example; in any case, this may process an image signal imaged by the solid-state image sensor. This may be applied to various electronic devices such as an imaging device such as a digital still camera and a digital video camera, a mobile phone having an imaging function, or another device having the imaging function, for example, provided with the solid-state image sensor together with such signal processor.

Figure 22:
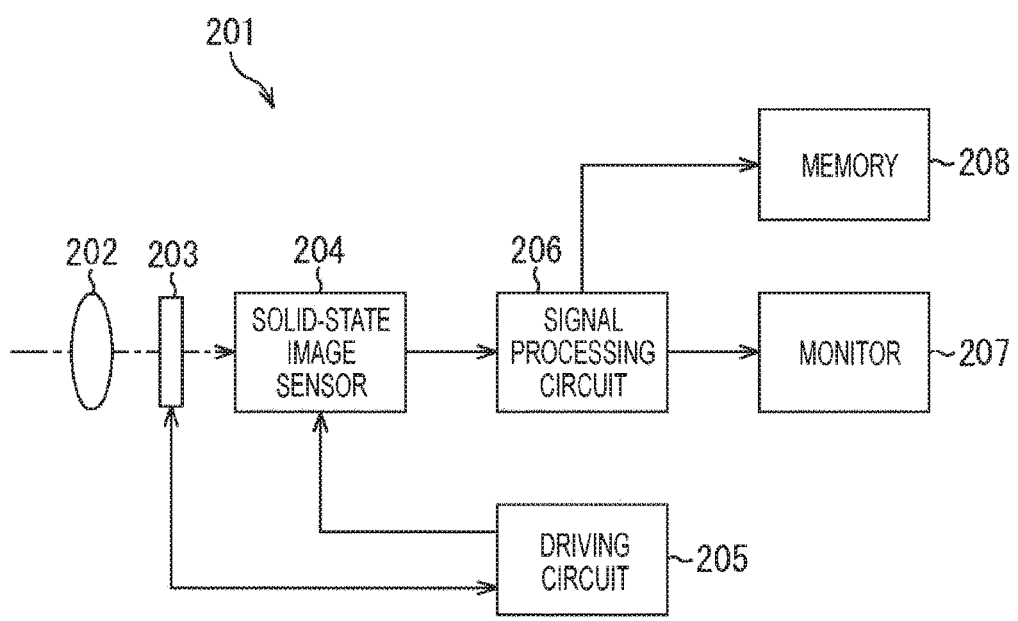
FIG. 22 is a view illustrating application to an electronic device.

FIG. 22 is a block diagram illustrating a configuration example of the imaging device as the electronic device to which the present technology is applied.

An imaging device 201 illustrated in FIG. 22 provided with an optical system 202, a shutter device 203, a solid-state image sensor 204, a driving circuit 205, a signal processing circuit 206, a monitor 207, and a memory 208 may image a still image and a moving image.

The optical system 202 formed of one or a plurality of lenses guides light from a subject (incident light) to the solid-state image sensor 204 to form an image on a light-receiving surface of the solid-state image sensor 204.

The shutter device 203 arranged between the optical system 202 and the solid-state image sensor 204 controls a light emission period to the solid-state image sensor 204 and a light shielding period according to control of the driving circuit 205.

The solid-state image sensor 204 is formed of the above-described solid-state image sensor. The solid-state image sensor 204 stores a signal charge for a certain period according to the light the image of which is formed on the light-receiving surface through the optical system 202 and the shutter device 203. The signal charge stored in the solid-state image sensor 204 is transferred according to a driving signal (timing signal) supplied from the driving circuit 205. The solid-state image sensor 204 may be formed as one chip alone or may be formed as a part of a camera module packaged together with the optical system 202 or the signal processing circuit 206.

The driving circuit 205 outputs the driving signal to control transfer operation of the solid-state image sensor 204 and shutter operation of the shutter device 203 to drive the solid-state image sensor 204 and the shutter device 203.

The signal processing circuit 206 being the above-described signal processor 11, for example, applies various types of signal processing to the signal charge output from the solid-state image sensor 204. The image (image data) obtained by the signal processing applied by the signal processing circuit 206 is supplied to the monitor 207 to be displayed or supplied to the memory 208 to be stored (recorded).

<Example of Execution by Software>

The series of processes described above may be executed by hardware or by software. When the series of processes is executed by the software, a program which forms the software is installed from a recording medium on a computer built in dedicated hardware or a general-purpose personal computer, for example, capable of executing various functions with various programs installed.

Figure 23:
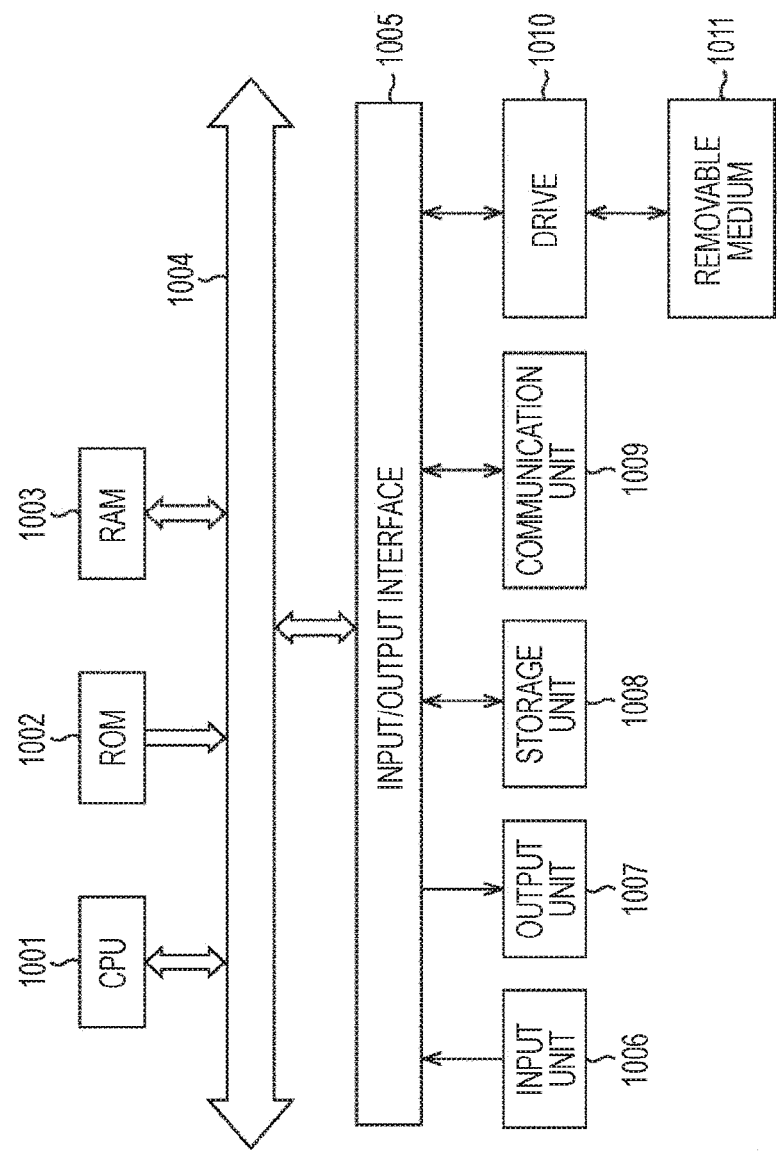
FIG. 23 is a view illustrating a configuration example of a general-purpose personal computer.

FIG. 23 illustrates a configuration example of the general-purpose personal computer. The personal computer includes a central processing unit (CPU) 1001 built-in. An input/output interface 1005 is connected to the CPU 1001 through a bus 1004. A read only memory (ROM) 1002 and a random access memory (RAM) 1003 are connected to the bus 1004.

An input unit 1006 formed of an input device such as a keyboard and a mouse with which a user inputs an operation command, an output unit 1007 which outputs a processing operation screen and an image of a processing result to a display device, a storage unit 1008 formed of a hard disk drive and the like which stores the program and various data, and a communication unit 1009 formed of a local area network (LAN) adopter which executes a communication process through a network typified by the Internet are connected to the input/output interface 1005. Also, a drive 1010 which reads/writes data from/to a removable medium 1011 such as a magnetic disk (including a flexible disk), an optical disk (including a compact disc-read only memory (CD-ROM) and a digital versatile disc (DVD)), a magneto-optical disk (including a Mini Disc (MD)), or a semiconductor memory is connected.

The CPU 1001 executes various processes according to the program stored in the ROM 1002 or the program read from the removable medium 1011 such as the magnetic disk, the optical disk, the magneto-optical disk, or the semiconductor memory to be installed on the storage unit 1008 and loaded from the storage unit 1008 on the RAM 1003. Data required for the CPU 1001 to execute the various processes also are appropriately stored in the RAM 1003.

In the computer configured in the above-described manner, the CPU 1001 loads the program stored in the storage unit 1008, for example, on the RAM 1003 through the input/output interface 1005 and the bus 1004 to execute, and according to this, the series of processes described above is performed.

The program executed by the computer (CPU 1001) may be recorded in the removable medium 1011 as a package medium and the like to be provided, for example. Also, the program may be provided by means of a wired or wireless transmission medium such as a local area network, the Internet, and digital broadcasting.

In the computer, the program may be installed on the storage unit 1008 through the input/output interface 1005 by mounting the removable medium 1011 on the drive 1010. Also, the program may be received by the communication unit 1009 by means of the wired or wireless transmission medium to be installed on the storage unit 1008. In addition, the program may be installed in advance on the ROM 1002 and the storage unit 1008.

Meanwhile, the program executed by the computer may be the program of which processes are performed in chronological order in the order described in this description or may be the program of which processes are performed in parallel or at required timing such as when a call is issued.

Also, in this specification, a system is intended to mean assembly of a plurality of components (devices, modules (parts) and the like) and it does not matter whether all the components are in the same casing. Therefore, a plurality of devices stored in different casings connected through the network and one device obtained by storing a plurality of modules in one casing are the systems.

Meanwhile, the embodiments of the present technology are not limited to the above-described embodiments and various modifications may be made without departing from the scope of the present technology.

For example, the present technology may be configured as cloud computing in which a function is shared by a plurality of devices through the network to process together.

Also, each step described in the above-described flowchart may be executed by one device or executed by a plurality of devices in a shared manner.

Furthermore, when a plurality of processes is included in one step, a plurality of processes included in one step may be executed by one device or by a plurality of devices in a shared manner.

Meanwhile, the present technology may also have a following configuration.

(1) A signal processing device including:
a current position selection unit which selects a pixel position on an input image as a current pixel being a pixel in a current position a pixel value of which is interpolated;
a candidate line setting unit which sets at least two groups of lines, each group including assembly of at least one line in the same direction including at least two pixels having known pixel values in the vicinity of the current pixel as candidate lines;
a candidate line narrowing unit which narrows the candidate lines on the basis of a pattern to which the current pixel belongs; and
an interpolated value calculation unit which calculates the pixel value of the current pixel as an interpolated value by interpolation based on each pixel on the candidate line narrowed by the candidate line narrowing unit.

(2) The signal processing device according to (1), wherein the candidate lines include two groups of the candidate lines orthogonal to each other, each group including two candidate lines in positional relationship symmetrical about the current pixel.

(3) The signal processing device according to (2), wherein the two groups of the candidate lines orthogonal to each other are the candidate lines in a horizontal direction and the candidate lines in a vertical direction.

(4) The signal processing device according to (1), wherein the candidate lines include four groups of the candidate lines intersected at a 45-degree angle, each group including two candidate lines in positional relationship symmetrical about the current pixel.

(5) The signal processing device according to (1), wherein the candidate lines include the candidate line passing through the current pixel.

(6) The signal processing device according to any one of (1) to (5), further including:
a weight value calculation unit which sequentially searches the pixels on the candidate line and calculates a weight value according to a degree of expectation that a searched pixel being a pixel to be searched on the candidate line belongs to the same pattern as the pattern to which the current pixel belongs, wherein
the interpolated value calculation unit interpolates by weighted addition using a pixel value of each pixel on the candidate line narrowed by the candidate line narrowing unit and the weight value and calculates the pixel value of the current pixel as the interpolated value.

(7) The signal processing device according to (6), further including:
a searched pixel narrowing unit which narrows searched pixels on the candidate line on the basis of the pattern to which the current pixel belongs.

(8) The signal processing device according to (6), wherein the pattern to which the pixel belongs is an edge in the image.

(9) The signal processing device according to any one of (1) to (8), further including:
an artifact reduction unit which reduces an artifact by an image processing filter which reduces a high-frequency component from the interpolated value.

(10) The signal processing device according to any one of (1) to (9), further including:
at least another type of interpolated value calculation unit which calculates the interpolated value by an interpolation method different from the interpolation method by the interpolated value calculation unit; and
a pattern classification unit which classifies the pattern to which the current pixel belongs, determines whether to output the interpolated value calculated by the other interpolated value calculation unit on the basis of a classification result, and outputs the interpolated value calculated by the other interpolated value calculation unit according to a determination result, wherein
the interpolated value calculation unit calculates the interpolated value and outputs the calculated interpolated vale when the pattern classification unit determines not to output the interpolated value calculated by the other interpolated value calculation unit on the basis of the classification result.

(11) The signal processing device according to any one of (1) to (9), further including:
a pattern classification unit which classifies the pattern to which the current pixel belongs;
at least another type of interpolated value calculation unit different from the interpolation method by the interpolated value calculation unit; and
an interpolated value selection unit which selects the interpolated value to be output from a plurality of interpolated values on the basis of a type of the pattern classified by the pattern classification unit.

(12) A signal processing method including steps of:
selecting a pixel position on an input image as a current pixel being a pixel in a current position a pixel value of which is interpolated;
setting at least two groups of lines, each group including assembly of at least one line in the same direction including at least two pixels having known pixel values in the vicinity of the current pixel as candidate lines;
narrowing the candidate lines on the basis of a pattern to which the current pixel belongs; and
calculating the pixel value of the current pixel as an interpolated value by interpolation based on each pixel on the narrowed candidate line.

(13) A program which allows a computer to serve as:
a current position selection unit which selects a pixel position on an input image as a current pixel being a pixel in a current position a pixel value of which is interpolated;
a candidate line setting unit which sets at least two groups of lines, each group including assembly of at least one line in the same direction including at least two pixels having known pixel values in the vicinity of the current pixel as candidate lines;

a candidate line narrowing unit which narrows the candidate lines on the basis of a pattern to which the current pixel belongs; and an interpolated value calculation unit which calculates the pixel value of the current pixel as an interpolated value by interpolation based on each pixel on the candidate line narrowed by the candidate line narrowing unit.

(14) A solid-state image sensor including:

a current position selection unit which selects a pixel position on an input image as a current pixel being a pixel in a current position a pixel value of which is interpolated;

a candidate line setting unit which sets at least two groups of lines, each group including assembly of at least one line in the same direction including at least two pixels having known pixel values in the vicinity of the current pixel as candidate lines;

a candidate line narrowing unit which narrows the candidate lines on the basis of a pattern to which the current pixel belongs; and an interpolated value calculation unit which calculates the pixel value of the current pixel as an interpolated value by interpolation based on each pixel on the candidate line narrowed by the candidate line narrowing unit.

(15) An imaging device including:

a current position selection unit which selects a pixel position on an input image as a current pixel being a pixel in a current position a pixel value of which is interpolated;

a candidate line setting unit which sets at least two groups of lines, each group formed of assembly of at least one line in the same direction including at least two pixels having known pixel values in the vicinity of the current pixel as candidate lines;

a candidate line narrowing unit which narrows the candidate lines on the basis of a pattern to which the current pixel belongs; and an interpolated value calculation unit which calculates the pixel value of the current pixel as an interpolated value by interpolation based on each pixel on the candidate line narrowed by the candidate line narrowing unit.

(16) An electronic device including:

a current position selection unit which selects a pixel position on an input image as a current pixel being a pixel in a current position a pixel value of which is interpolated;

a candidate line setting unit which sets at least two groups of lines, each group including assembly of at least one line in the same direction including at least two pixels having known pixel values in the vicinity of the current pixel as candidate lines;

a candidate line narrowing unit which narrows the candidate lines on the basis of a pattern to which the current pixel belongs; and an interpolated value calculation unit which calculates the pixel value of the current pixel as an interpolated value by interpolation based on each pixel on the candidate line narrowed by the candidate line narrowing unit.

REFERENCE SIGNS LIST

11 Signal processor
31 Enlarging unit
32 Current position selection unit
33 Candidate line setting unit
34 Candidate line narrowing unit
35 Searched pixel narrowing unit
36 Weight value calculation unit
37 Interpolated value calculation unit
38 Artifact reduction unit
51 Simple interpolated value calculation unit
52 Pattern classification unit
61 Interpolated value selection unit

The invention claimed is:

1. A signal processing device, comprising:
an enlarging unit configured to interpolate a plurality of first pixels into an input image comprising a plurality of second pixels;
a current position selection unit configured to select, as a current pixel, one of the plurality of first pixels having a current position on the input image;
a candidate line setting unit configured to set, as a plurality of candidate lines, at least two groups of candidate lines,
wherein each group of the at least two groups of candidate lines comprises at least one candidate line,
wherein the at least one candidate line comprises at least two pixels of the plurality of second pixels, and
wherein each of the at least two pixels are adjacent to the current pixel;
a candidate line narrowing unit configured to:
determine a direction of a pattern in the input image based on the at least two groups of candidate lines, wherein the current pixel belongs to the pattern; and
select at least one group of candidate lines from among the at least two groups of candidate lines based on the direction of the pattern in the input image; and
a first interpolated value calculation unit configured to calculate, as a first interpolated value, a first pixel value of the current pixel based on each pixel on the selected at least one group of candidate lines.

2. The signal processing device according to claim 1, wherein a first group of candidate lines of the at least two groups of candidate lines is orthogonal to a second group of candidate lines of the at least two group of candidate lines, and
wherein each group of the at least two groups of candidate lines comprises two candidate lines of the plurality of candidate lines in a positional relationship symmetrical about the current pixel.

3. The signal processing device according to claim 2, wherein each line of the first group of candidate lines is in a horizontal direction, and
wherein each line of the second group of candidate lines is in a vertical direction.

4. The signal processing device according to claim 1, wherein the plurality of candidate lines include four groups of the candidate lines,
wherein a first group of the four groups is at a 45-degree angle with a second group of the four groups, and
wherein each group of the four groups comprises two candidate lines of the plurality of candidate lines in a positional relationship symmetrical about the current pixel.

5. The signal processing device according to claim 1, wherein a candidate line of the plurality of candidate lines passes through the current pixel.

6. The signal processing device according to claim 1, further comprising:
a weight value calculation unit configured to:
sequentially search at least one pixel on each candidate line of the plurality of candidate lines; and calculate a weight value based on a degree of expectation that the searched at least one pixel belongs to the pattern, wherein the first interpolated value calculation unit is further configured to:

calculate, as the first interpolated value, weighted addition based on the weight value and a second pixel value of each pixel on the selected at least one group of candidate lines; and set the first pixel value of the current pixel as the first interpolated value.

7. The signal processing device according to claim 6, further comprising a searched pixel narrowing unit configured to select at least one narrowed pixel from among the searched at least one pixel based on the pattern.

8. The signal processing device according to claim 6, wherein the pattern is an edge in the input image.

9. The signal processing device according to claim 1, further comprising an artifact reduction unit configured to reduce an artifact based on a reduction of a high-frequency component from the first interpolated value.

10. The signal processing device according to claim 1, further comprising:

a second interpolated value calculation unit configured to calculate a second interpolated value based on a first interpolation method different from a second interpolation method of the first interpolated value calculation unit; and a pattern classification unit configured to:
classify the pattern; and
output one of the first interpolated value or the second interpolated value based on the classification.

11. The signal processing device according to claim 1, further comprising:

a pattern classification unit configured to classify the pattern;

a second interpolated value calculation unit configured to calculate a second interpolated value based on a first interpolation method different from a second interpolation method of the first interpolated value calculation unit; and an interpolated value selection unit configured to select, as an output value, one of the first interpolated value or the second interpolated value based on the classification.

12. A signal processing method, comprising:
interpolating a plurality of first pixels into an input image comprising a plurality of second pixels;
selecting, as a current pixel, one of the plurality of first pixels having a current position on the input image;
setting, as a plurality of candidate lines, at least two groups of candidate lines,
wherein each group of the at least two groups of candidate lines comprises at least one candidate line,
wherein the at least one candidate line comprises at least two pixels of the plurality of second pixels, and
wherein each of the at least two pixels are adjacent to the current pixel;
determining a direction of a pattern in the input image based on the at least two groups of candidate lines,
wherein the current pixel belongs to the pattern;
selecting at least one group of candidate lines from among the at least two groups of candidate lines based on the direction of the pattern in the input image; and
calculating, as an interpolated value, a pixel value of the current pixel based on each pixel on the selected at least one group of candidate lines.

13. A non-transitory computer-readable medium having stored thereon, computer-readable instructions, which when executed by a computer, cause the computer to execute operations, the operations comprising:
interpolating a plurality of first pixels into an input image comprising a plurality of second pixels;
selecting, as a current pixel, one of the plurality of first pixels having a current position on the input image;
setting, as a plurality of candidate lines, at least two groups of candidate lines,
wherein each group of the at least two groups of candidate lines comprises at least one candidate line,
wherein the at least one candidate line comprises at least two pixels of the plurality of second pixels, and
wherein each of the at least two pixels are adjacent to the current pixel;
determining a direction of a pattern in the input image based on the at least two groups of candidate lines,
wherein the current pixel belongs to the pattern;
selecting at least one group of candidate lines from among the at least two groups of candidate lines based on the direction of the pattern in the input image; and
calculating, as an interpolated value, a pixel value of the current pixel based on each pixel on the selected at least one group of candidate lines.

14. A solid-state image sensor, comprising:
an enlarging unit configured to interpolate a plurality of first pixels into an input image comprising a plurality of second pixels;
a current position selection unit configured to select, as a current pixel, one of the plurality of first pixels having a current position on the input image;
a candidate line setting unit configured to set, as a plurality of candidate lines, at least two groups of candidate lines,
wherein each group of the at least two groups of candidate lines comprises at least one candidate line,
wherein the at least one candidate line comprises at least two pixels of the plurality of second pixels, and
wherein each of the at least two pixels are adjacent to the current pixel;
a candidate line narrowing unit configured to:
determine a direction of a pattern in the input image based on the at least two groups of candidate lines,
wherein the current pixel belongs to the pattern; and
select at least one group of candidate lines from among the at least two groups of candidate lines based on the direction of the pattern in the input image; and
an interpolated value calculation unit configured to calculate, as an interpolated value, a pixel value of the current pixel based on each pixel on the selected at least one group of candidate lines.

15. An imaging device, comprising:
an enlarging unit configured to interpolate a plurality of first pixels into an input image comprising a plurality of second pixels;
a current position selection unit configured to select, as a current pixel, one of the plurality of first pixels having a current position on the input image;
a candidate line setting unit configured to set, as a plurality of candidate lines, at least two groups of candidate lines,
wherein each group of the at least two groups of candidate lines comprises at least one candidate line,
wherein the at least one candidate line comprises at least two pixels of the plurality of second pixels, and wherein each of the at least two pixels are adjacent to the current pixel;
a candidate line narrowing unit configured to:
  determine a direction of a pattern in the input image based on the at least two groups of candidate lines, wherein the current pixel belongs to the pattern; and
  select at least one group of candidate lines from among the at least two groups of candidate lines based on the direction of the pattern in the input image; and
an interpolated value calculation unit configured to calculate, as an interpolated value, a pixel value of the current pixel based on each pixel on the selected at least one group of candidate lines.

16. An electronic device, comprising:
an enlarging unit configured to interpolate a plurality of first pixels into an input image comprising a plurality of second pixels;
a current position selection unit configured to select, as a current pixel, one of the plurality of first pixels having a current position on the input image;
a candidate line setting unit configured to set, as a plurality of candidate lines, at least two groups of candidate lines,
  wherein each group of the at least two groups of candidate lines comprises at least one candidate line,
  wherein the at least one candidate line comprises at least two pixels of the plurality of second pixels, and
  wherein each of the at least two pixels are adjacent to the current pixel;
a candidate line narrowing unit configured to:
  determine a direction of a pattern in the input image based on the at least two groups of candidate lines, wherein the current pixel belongs to the pattern; and
  select at least one group of candidate lines from among the at least two groups of candidate lines based on the direction of the pattern in the input image; and
an interpolated value calculation unit configured to calculate, as an interpolated value, a pixel value of the current pixel based on each pixel on the selected at least one group of candidate lines.

* * * * *